(12) United States Patent
Noma

(10) Patent No.: US 11,073,736 B2
(45) Date of Patent: Jul. 27, 2021

(54) VIEW ANGLE CONTROL DEVICE

(71) Applicant: SHARP KABUSHIKI KAISHA, Sakai (JP)

(72) Inventor: Mikihiro Noma, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 170 days.

(21) Appl. No.: 16/653,556

(22) Filed: Oct. 15, 2019

(65) Prior Publication Data

US 2020/0124934 A1    Apr. 23, 2020

Related U.S. Application Data

(60) Provisional application No. 62/749,493, filed on Oct. 23, 2018.

(51) Int. Cl.

| | |
|---|---|
| *G02F 1/155* | (2006.01) |
| *G09G 3/19* | (2006.01) |
| *G09G 3/38* | (2006.01) |
| *G09G 3/36* | (2006.01) |
| *G02F 1/1523* | (2019.01) |

(52) U.S. Cl.
CPC ............... *G02F 1/155* (2013.01); *G09G 3/19* (2013.01); *G09G 3/38* (2013.01); *G02F 1/1525* (2013.01); *G09G 3/3611* (2013.01); *G09G 2320/068* (2013.01)

(58) Field of Classification Search
CPC .. G02F 1/1525; G02F 2201/44; G02F 1/1323; G02F 1/155; G09G 3/3611; G09G 2320/068; G09G 3/19; G09G 3/38
See application file for complete search history.

(56) References Cited

U.S. PATENT DOCUMENTS

| | | | |
|---|---|---|---|
| 2008/0002110 A1* | 1/2008 | Choi ................. | G02F 1/133514 349/106 |
| 2018/0067345 A1* | 3/2018 | Tang .................... | G02F 1/1323 |
| 2019/0171080 A1* | 6/2019 | Wu ......................... | G02F 1/155 |
| 2020/0124936 A1* | 4/2020 | Shiota .................... | G02F 1/167 |

FOREIGN PATENT DOCUMENTS

JP        2011-013451 A        1/2011

\* cited by examiner

*Primary Examiner* — George G King
(74) *Attorney, Agent, or Firm* — ScienBiziP, P.C.

(57) ABSTRACT

A view angle control device includes an electrochromic layer including a first extending section extending in a first direction and a second extending section extending in a second direction that crosses the first direction, light transmission layers defined by the first extending section and the second extending section, a first electrode disposed arranged to overlap the first extending section and contacted with the first extending section, a second electrode arranged to overlap the second extending section and contacted with the second extending section, a third electrode arranged not to overlap the first electrode but to overlap the second extending section and contacted with the second extending section, and a fourth electrode arranged not to overlap the second electrode but to overlap the first extending section and contacted with the first extending section.

8 Claims, 18 Drawing Sheets

VIEW ANGLE CONTROL DEVICE

CROSS REFERENCE TO RELATED APPLICATION

This application claims priority from U.S. Provisional Patent Application No. 62/749,493 filed on Oct. 23, 2018. The entire contents of the priority application are incorporated herein by reference.

TECHNICAL FIELD

The technology described herein relates to a view angle control device.

BACKGROUND ART

A view angle control device described in Japanese Unexamined Patent Application Publication No. 2011-13451 has been known as one example thereof. A viewing angle control filter, which is an example of the view angle control device, includes a plurality of chromism layers and a plurality of transparent layers arranged between adjacent chromism layers, respectively. The chromism layers have main surfaces along a reference line-of-sight direction with respect to the filter main surface and are arranged in parallel in a predetermined direction and have a light absorption spectral characteristic according to an applied voltage.

The viewing angle control filter includes a first filter and a second filter that are layered on each other. The first filter includes a group of first chromism layers that are arranged in a first direction and the second filter includes a group of second chromism layers that are arranged in a second direction perpendicular to the first direction. According to such a configuration, the view angle can be selectively controlled with respect to one of the first direction and the second direction. However, the first filter and the second filter are disposed in a layered structure and this increases a thickness of the viewing angle control filter and complicates a producing process.

SUMMARY

The technology described herein was made in view of the above circumstances. An object is to reduce a thickness while obtaining high view angle control properties.

A view angle control device according to the technology described herein includes an electrochromic layer having light absorption spectrum characteristics according to voltages applied thereto, the electrochromic layer including a first extending section extending in a first direction and a second extending section extending in a second direction that crosses the first direction, light transmission layers that are defined by the first extending section and the second extending section and through which light passes, a first electrode disposed on one side with respect to the electrochromic layer and the light transmission layers and arranged to overlap the first extending section and contacted with the first extending section, a second electrode disposed on an opposite side from the first electrode with respect to the electrochromic layer and the light transmission layers and arranged to overlap the second extending section and contacted with the second extending section, a third electrode disposed on a same side as the first electrode with respect to the electrochromic layer and the light transmission layers and arranged not to overlap the first electrode but to overlap the second extending section and contacted with the second extending section, and a fourth electrode disposed on a same side as the second electrode with respect to the electrochromic layer and the light transmission layers and arranged not to overlap the second electrode but to overlap the first extending section and contacted with the first extending section.

According to the technology described herein, a thickness is reduced while obtaining high view angle control properties.

DETAILED DESCRIPTION

First Embodiment

Figure 1:
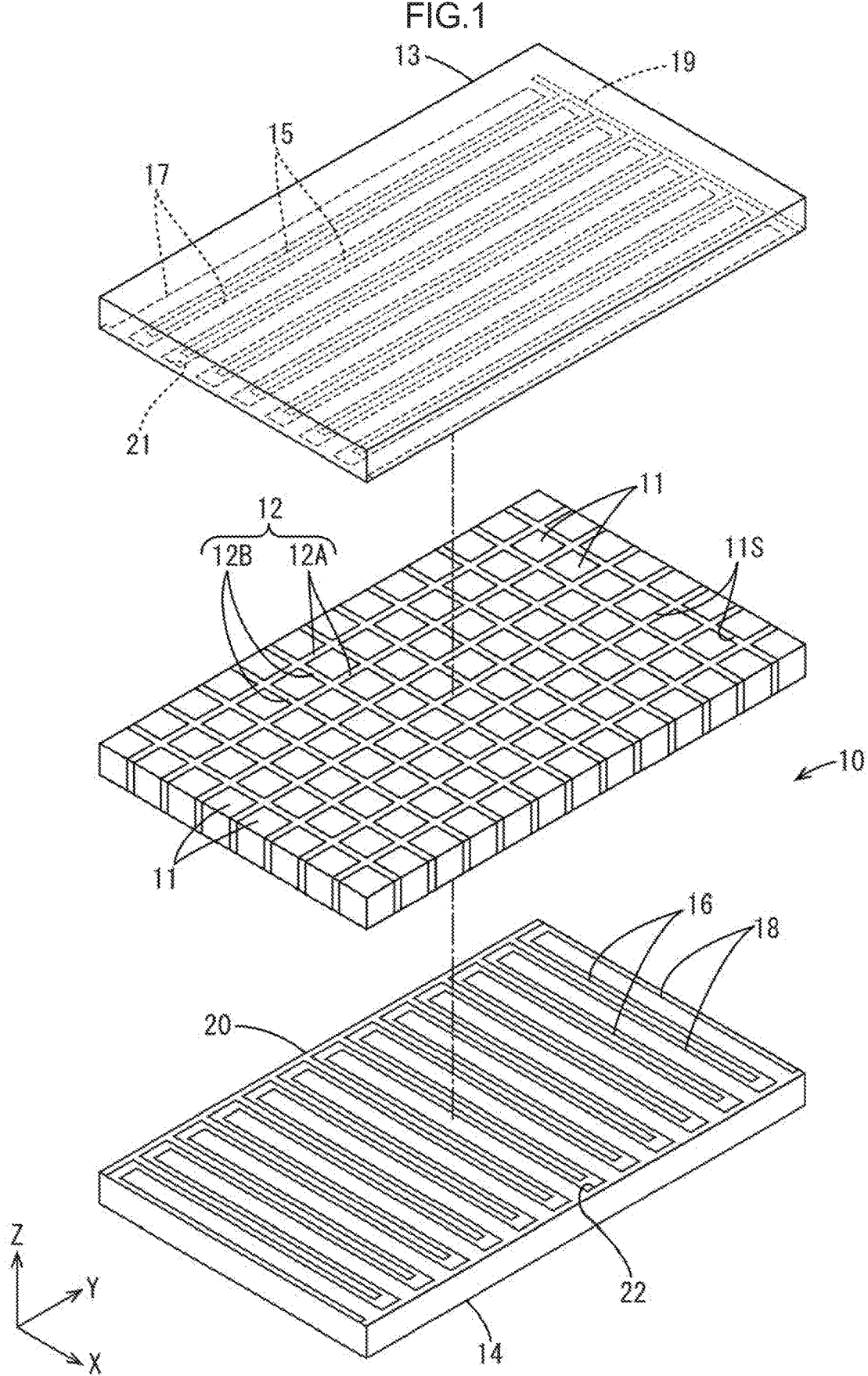
FIG. 1 is an exploded view of a view angle control sheet according to a first embodiment.

A first embodiment will be described with reference to FIGS. 1 to 12. In this embodiment section, (a view angle control device) 10 will be described. X-axes, Y-axes, and Z-axes may be present in the drawings. The axes in each drawing correspond to the respective axes in other drawings. An upper side and a lower side in FIGS. 1 and 5 to 8 correspond to a front side and a back side, respectively.

A view angle control sheet 10 is used in combination with a display device that displays an image so that an angle range in which the image displayed on the display device can be seen, that is, a view angle can be controlled. For example, the view angle control sheet 10 may be used in combination with a liquid crystal display device that includes a liquid crystal panel as a display panel. In such a configuration, the view angle control sheet 10 is preferably arranged between the liquid crystal panel and a backlight unit that supplies light to the liquid crystal panel for displaying. Other than such a configuration, the view angle control sheet 10 may be arranged on the liquid crystal panel on an opposite side from the backlight unit side. The view angle control sheet 10 may be used in combination with an organic EL display device that includes an organic EL display panel as the display panel. In such a configuration, the view angle control sheet 10 is preferably arranged on the organic EL panel on a light exit side (on a user's side). Other than the above configurations, a specific type of a display device that may be combined with the view angle control sheet 10 may be altered as appropriate.

As illustrated in FIG. 1, the view angle control sheet 10 has a vertically elongated square overall shape. A long side direction and a short side direction of the view angle control sheet 10 match the Y-axis direction (a first direction) and the X-axis direction (a second direction) in each drawing, respectively, and a thickness direction thereof matches the Z-axis direction. The view angle control sheet 10 includes light transmission layers 11 through which light passes, an electrochromic layer 12 that has light absorption spectrum characteristics according to voltages applied thereto, and a pair of substrates 13, 14 that sandwich the light transmission layers 11 and the electrochromic layer 12 therebetween. The pair of substrates 13, 14 are made of substantially transparent material of glass material or synthetic resin material such as PET or TAC and are formed in a plate form or a film form that has substantially flat plate surfaces on front and back surfaces. In the present embodiment, out of the substrates 13, 14, one on the front side is a first substrate 13 and another one on the back side is a second substrate 14.

Figure 2:
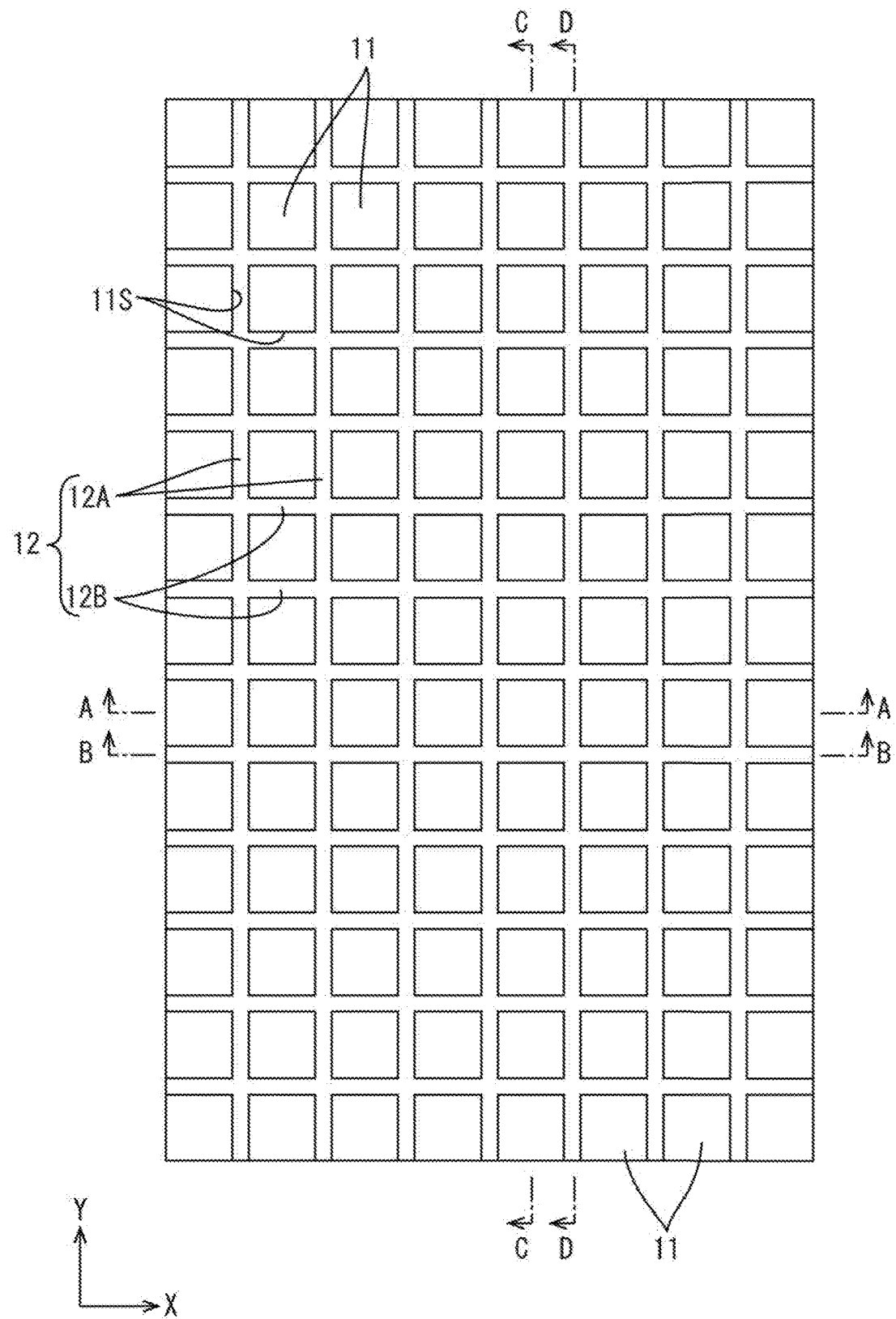
FIG. 2 is a plan view illustrating light transmission layers and an electrochromic layer included in the view angle control sheet.

The light transmission layers 11 are made of substantially transparent synthetic resin material such as acrylic resin material or epoxy resin material, and a thickness of each light transmission layer 11 is about 20 μm to 100 μm, for example. As illustrated in FIGS. 1 and 2, each of the light transmission layers 11 has a substantially block shape and the light transmission layers 11 are arranged in the X-axis direction and the Y-axis direction in rows and columns at predetermined intervals therebetween so as to be in planar arrangement. The light transmission layers 11 having such a configuration are formed by applying melted synthetic resin material over a plate surface of one of the pair of substrates 13, 14 in a solid manner and subsequently forming grooves 11S in a grid in a plan view. Therefore, a space that has a width dimension of the groove 11S is provided between the light transmission layers 11 that are next to each other in the X-axis direction and the Y-axis direction. The light transmission layer 11 has a substantially square plan view shape and a dimension of one side thereof is about 40 μm, for example. The number of the light transmission layers 11 arranged in the X-axis direction is smaller than that of the light transmission layers 11 arranged in the Y-axis direction. The groove 11S have a substantially same width dimension in portions extending in the X-axis direction and portions extending in the Y-axis direction.

The electrochromic layer 12 is made of electrochromic material such as prussian blue or tungsten oxide. The electrochromic material used for the electrochromic layer 12 varies its optical characteristics such as optical absorptance and optical transmittance according to applied voltage. In the present embodiment, the electrochromic layer 12 has light absorption spectrum characteristics such that the optical absorptance is increased and the optical transmittance is lowered when a voltage is applied and current is supplied compared to a case when no voltage is applied and no current is supplied. Specifically, the electrochromic layer 12 according to the present embodiment is substantially transparent and is less likely to absorb light and the light is transmitted therethrough when no current is supplied thereto. On the other hand, the electrochromic layer 12 exerts a dark color such as black due to an oxidation-reduction reaction and absorbs most of the light rays and blocks the light when current is supplied thereto. A potential difference of about from 2V to 5V is necessary for shifting a state of the electrochromic layer 12 from a light transmissive state to a light blocking state.

As illustrated in FIGS. 1 and 2, the electrochromic layer 12 is formed to fill spaces within the grooves 11S of the light transmission layers 11 and is included at a same layer level as the light transmission layers 11. The electrochromic layer 12 is formed in a grid in a plan view along the grooves 11S and is disposed to define each of the light transmission layers 11 that are adjacent to each other in the X-axis direction and the Y-axis direction. The electrochromic layer 12 includes first extending sections (first electrochromic layers) 12A and second extending sections (second electrochromic layers) 12B. The first extending sections 12A extend in the Y-axis direction and are arranged at intervals in the X-axis direction. The second extending sections 12B extend in the X-axis direction and are arranged at intervals in the Y-axis direction. In the present embodiment, the Y-axis direction matches a first direction that is an extending direction of the first extending sections 12A and the X-axis direction matches a second direction that is an extending direction of the second extending sections 12B. The first extending sections 12A extend in the Y-axis direction to define each of the light transmission layers 11 that are adjacent to each other in the X-axis direction. Therefore, the first extending sections 12A and the light transmission layers 11 are arranged alternately in the X-axis direction. The number of the first extending sections 12A arranged in the X-axis direction is a number that is obtained by subtracting one from the number of the light transmission layers 11 arranged in the same direction. The second extending sections 12B extend in the X-axis direction to define each of the light transmission layers 11 that are adjacent to each other in the Y-axis direction. Therefore, the second extending sections 12B and the light transmission layers 11 are arranged alternately in the Y-axis direction. The number of the second extending sections 12B arranged in the Y-axis direction is a number that is obtained by subtracting one from the number of the light transmission layers 11 arranged in the same direction. The electrochromic layer 12 having such a configuration is formed by filling spaces within the grooves 11S between the light transmission layers 11, which are formed on one of the pair of substrates 13, 14, with solvent including the electrochromic material. A specific width dimension of the electrochromic layer 12 (each groove 11S) is about 10 m, for example; however, it is preferably from about 1 µm to 2 µm in view of light blocking properties that are exerted when current is supplied thereto.

As illustrated in FIG. 1, a first electrode 15, a second electrode 16, a third electrode 17, and a fourth electrode 18 for applying voltages to the electrochromic layer 12, which is held between the pair of substrates 13, 14, are formed on the substrates 13, 14, respectively. The first electrode 15 and the third electrode 17 are formed on an inner side plate surface (opposite the electrochromic layer 12 and the light transmission layers 11) of the first substrate 13 and are disposed on a front side (one side) with respect to the electrochromic layer 12 and the light transmission layers 11. The second electrode 16 and the fourth electrode 18 are formed on an inner side plate surface of the second substrate 14 and are disposed on a back side with respect to the electrochromic layer 12 and the light transmission layers 11, that is, on an opposite side from the first electrode 15 and the third electrode 17. Accordingly, the electrochromic layer 12 and the light transmission layers 11 are sandwiched between the first and third electrodes 15, 17 and the second and fourth electrodes 16, 18. Each of the electrodes 15 to 18 is preferably made of transparent electrode material such as indium tin oxide (ITO) and indium zinc oxide (IZO), for example, to keep good light transmissivity. Other than that, opaque metal material such as silver may be used as the material for each of the electrodes 15 to 18, and in such a configuration, the opaque material may be formed in a quite thin film of from about 20 nm to 30 nm to keep a certain degree of light transmissivity. With such a configuration that each of the electrodes 15 to 18 is made of the opaque metal material, the light transmittance of the view angle control sheet 10 becomes uniform within a plane area thereof in each of the light transmissive state and the light blocking state of the electrochromic layer 12.

Figure 3:
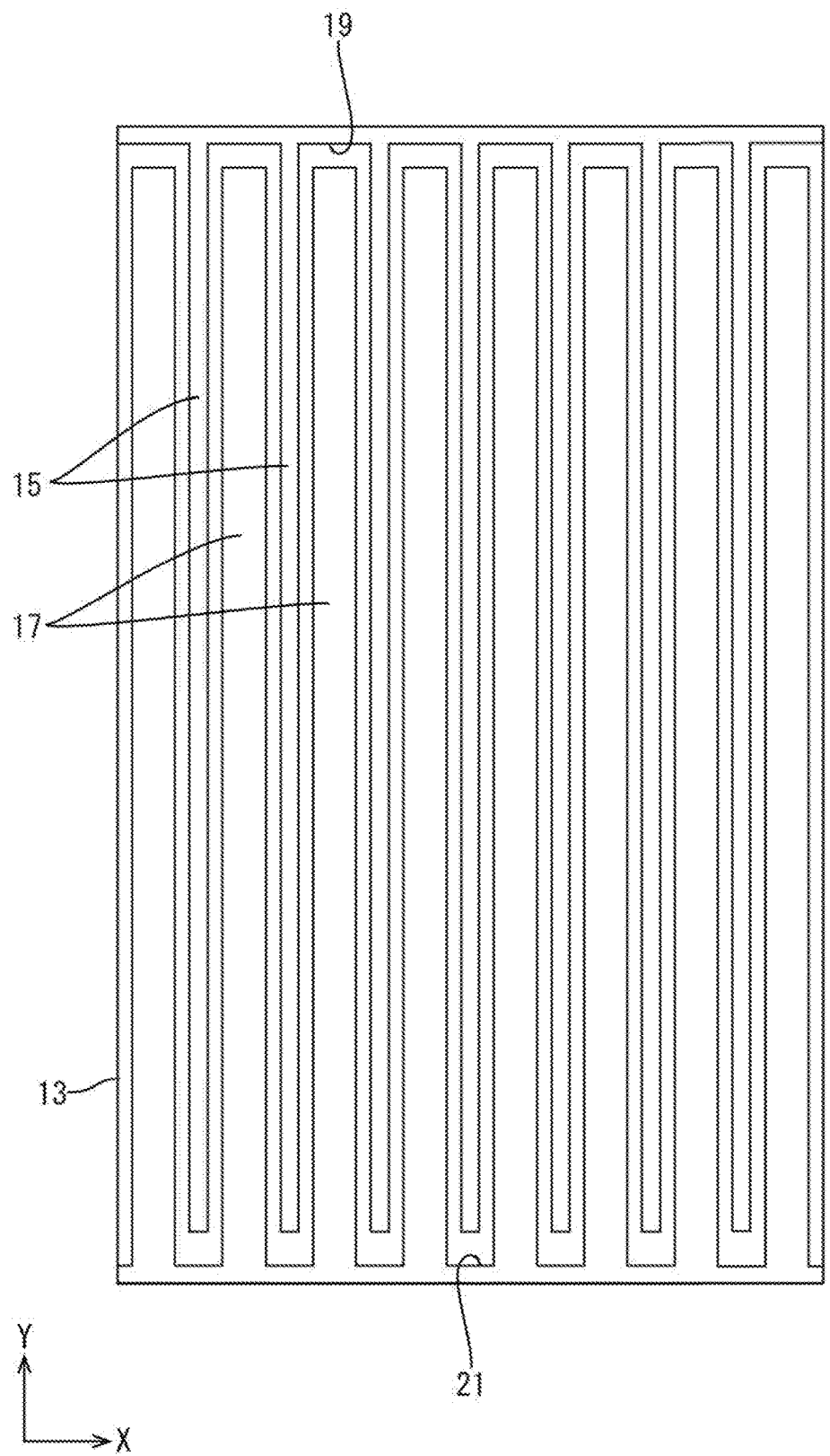
FIG. 3 is a bottom view of a first substrate of the view angle control sheet.

As illustrated in FIG. 3, the first electrodes 15 and the third electrodes 17 extend in the Y-axis direction on the first substrate 13 and are arranged alternately at intervals in the X-axis direction. Namely, the first electrodes 15 and the third electrodes 17 do not overlap each other. A first electrode connecting section 19 is formed on the first substrate 13 and is connected to each of the first electrodes 15 that are arranged at intervals in the X-axis direction and short-circuits the first electrodes 15. The first electrode connecting section 19 is disposed on one edge (on an upper side in FIG. 3) of the first substrate 13 with respect to the Y-axis direction and extends in the X-axis direction. The first electrode connecting section 19 is continuous to each of one end portions of the first electrodes 15 with respect to the Y-axis direction. All of the first electrodes 15 are collectively supplied with current if current is supplied to the first electrode connecting section 19. A third electrode connecting section 21 is formed on the first substrate 13 and is connected to each of the third electrodes 17 that are arranged at intervals in the X-axis direction and short-circuits the third electrodes 17. The third electrode connecting section 21 is disposed on another edge (on a lower side in FIG. 3) of the first substrate 13 with respect to the Y-axis direction, that is on an opposite edge from the first electrode connecting section 19 side edge, and extends in the X-axis direction. The third electrode connecting section 21 is continuous to each of another end portions of the third electrodes 17 with respect to the Y-axis direction. All of the third electrodes 17 are collectively supplied with current if current is supplied to the third electrode connecting section 21.

Figure 4:
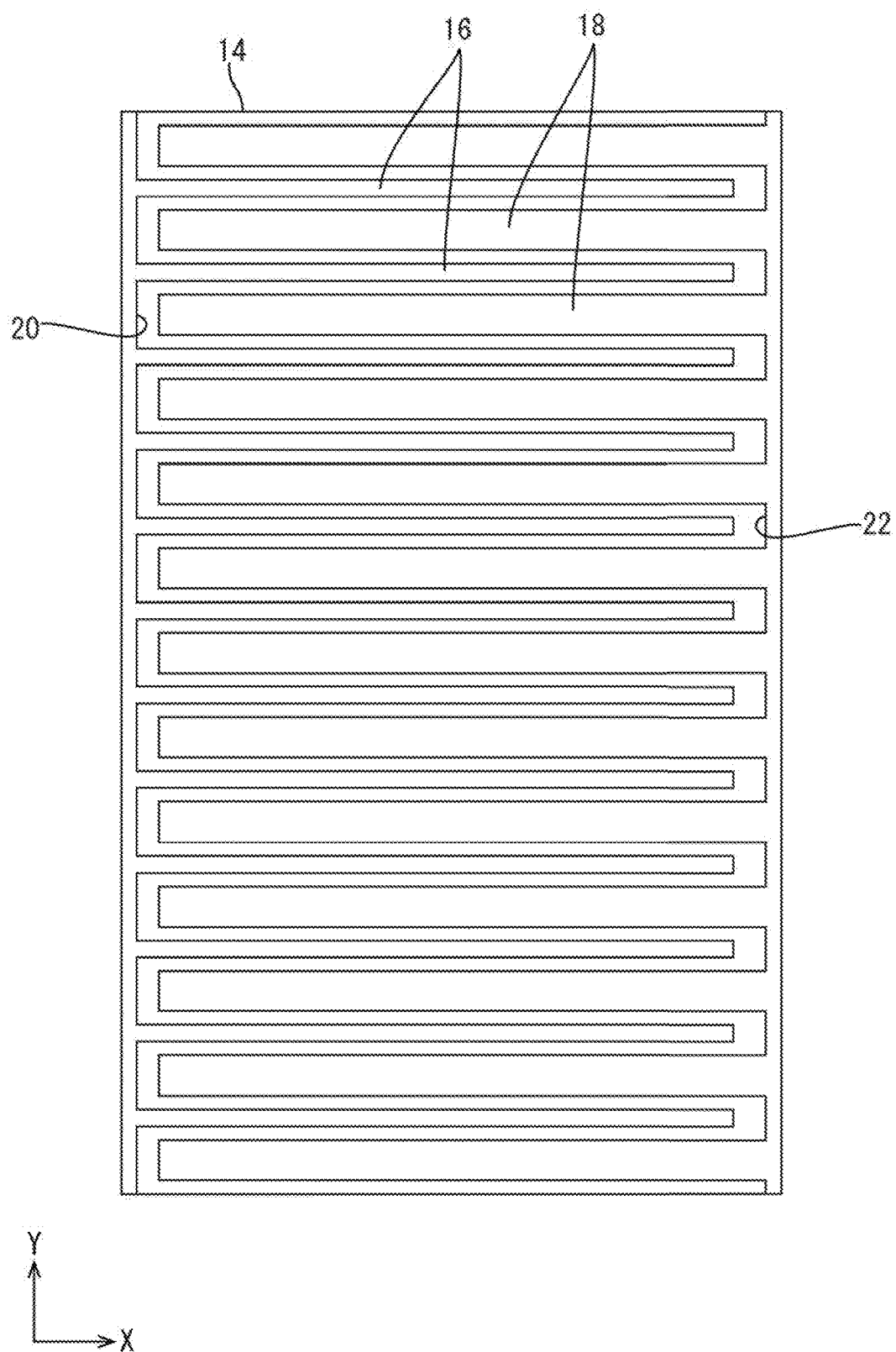
FIG. 4 is a plan view of a second substrate of the view angle control sheet.

As illustrated in FIG. 4, the second electrodes 16 and the fourth electrodes 18 extend in the X-axis direction on the second substrate 14 and are arranged alternately at intervals in the Y-axis direction. Namely, the second electrodes 16 and the fourth electrodes 18 do not overlap each other. A second electrode connecting section 20 is formed on the second substrate 14 and is connected to each of the second electrodes 16 that are arranged at intervals in the Y-axis direction and short-circuits the second electrodes 16. The second electrode connecting section 20 is disposed on one edge (on a left side in FIG. 4) of the second substrate 14 with respect to the X-axis direction and extends in the Y-axis direction. The second electrode connecting section 20 is continuous to each of one end portions of the second electrodes 16 with respect to the X-axis direction. All of the second electrodes 16 are collectively supplied with current if current is supplied to the second electrode connecting section 20. A fourth electrode connecting section 22 is formed on the second substrate 14 and is connected to each of the fourth electrodes 18 that are arranged at intervals in the Y-axis direction and short-circuits the fourth electrodes 18. The fourth electrode connecting section 22 is disposed on another edge (on a right side in FIG. 4) of the second substrate 14 with respect to the X-axis direction, that is on an opposite edge from the second electrode connecting section 20 side edge, and extends in the Y-axis direction. The fourth electrode connecting section 22 is continuous to each of another end portions of the fourth electrodes 18 with respect to the X-axis direction. All of the fourth electrodes 18 are collectively supplied with current if current is supplied to the fourth electrode connecting section 22.

Figure 5:
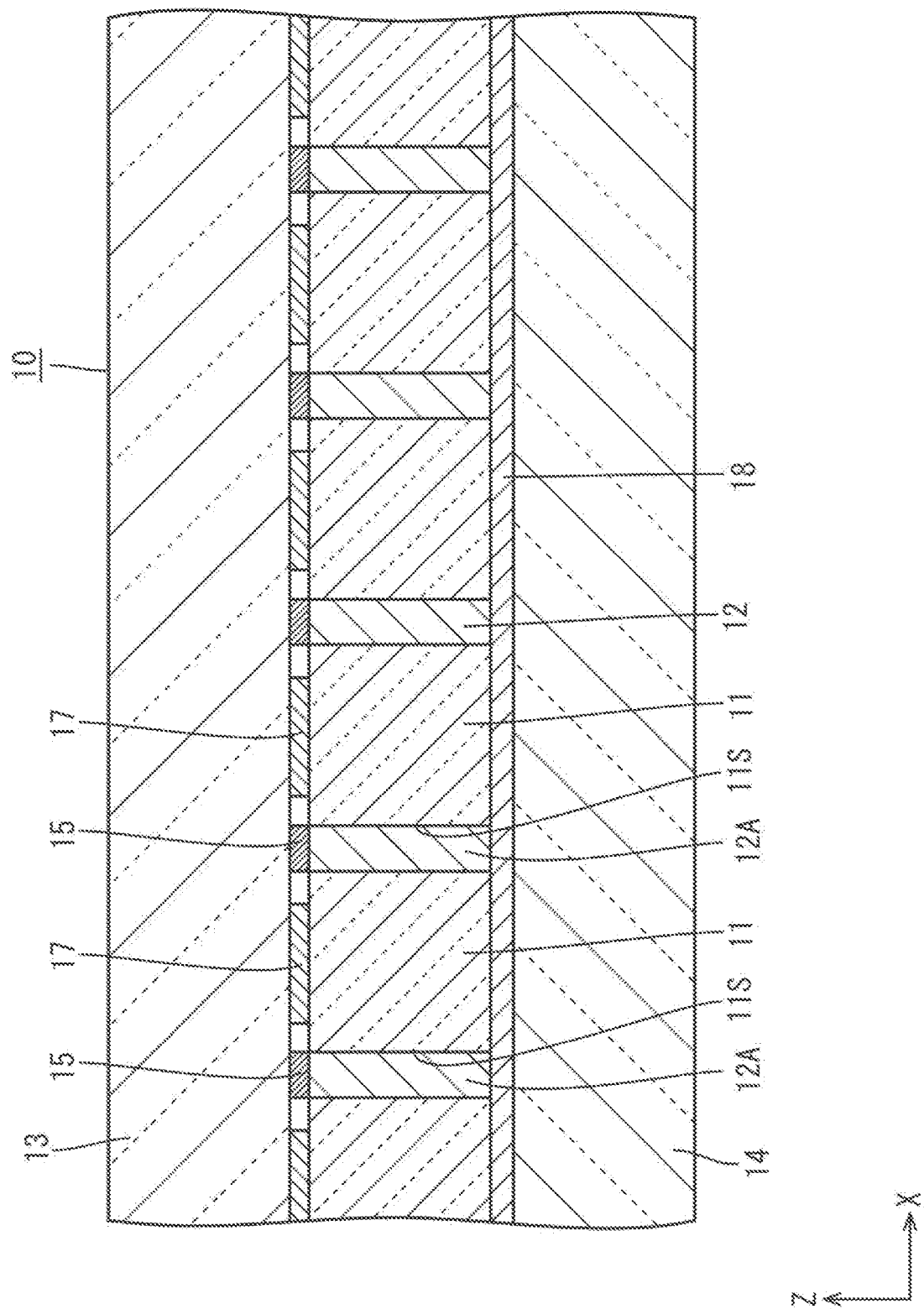
FIG. 5 is a cross-sectional view of the view angle control sheet taken along line A-A in FIG. 2.
Figure 6:
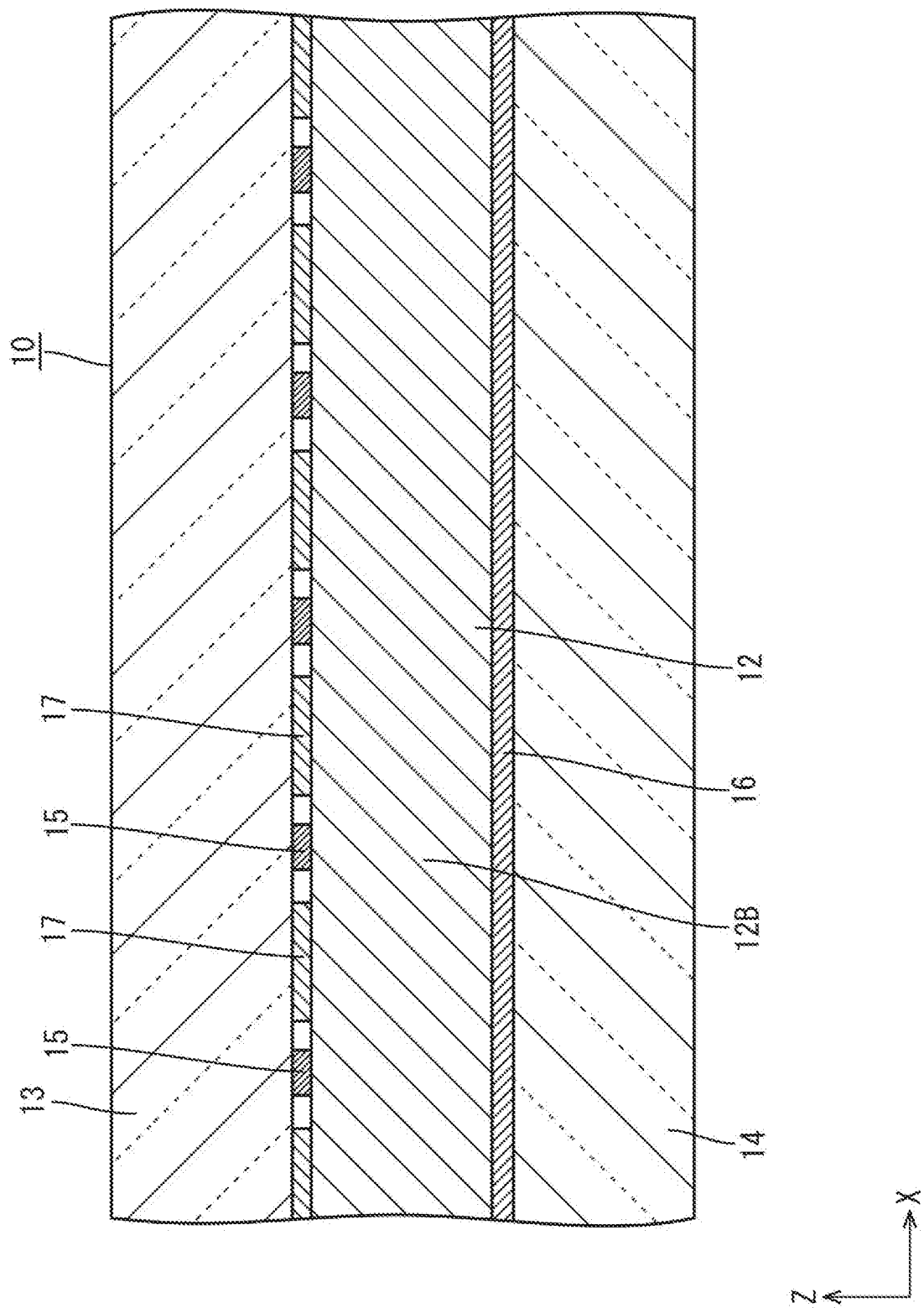
FIG. 6 is a cross-sectional view of the view angle control sheet taken along line B-B in FIG. 2.

As illustrated in FIG. 5, the first electrodes 15 overlap the first extending sections 12A that are included in the electrochromic layer 12 and extend parallel to the first electrodes 15, and the first electrodes 15 are contacted with front surfaces of the first extending sections 12A. Each of the first electrodes 15 has a width dimension that is equal to a width dimension of the first extending section 12A and is contacted with the first extending section 12A over an entire width surface thereof. As illustrated in FIG. 6, the third electrodes 17 do not overlap the first electrodes 15 but overlap the light transmission layers 11 that are adjacent to the first extending sections 12A with respect to the X-axis direction and also overlap portions of the second extending sections 12B except for the portions thereof crossing the first extending sections 12A. The third electrodes 17 are contacted with front surfaces of the overlapped portions. Each of the third electrodes 17 has a width dimension that is smaller than a width dimension of the light transmission layer 11. The front surfaces of the second extending sections 12B are contacted with the first electrodes 15 in addition to the third electrodes 17.

Figure 7:
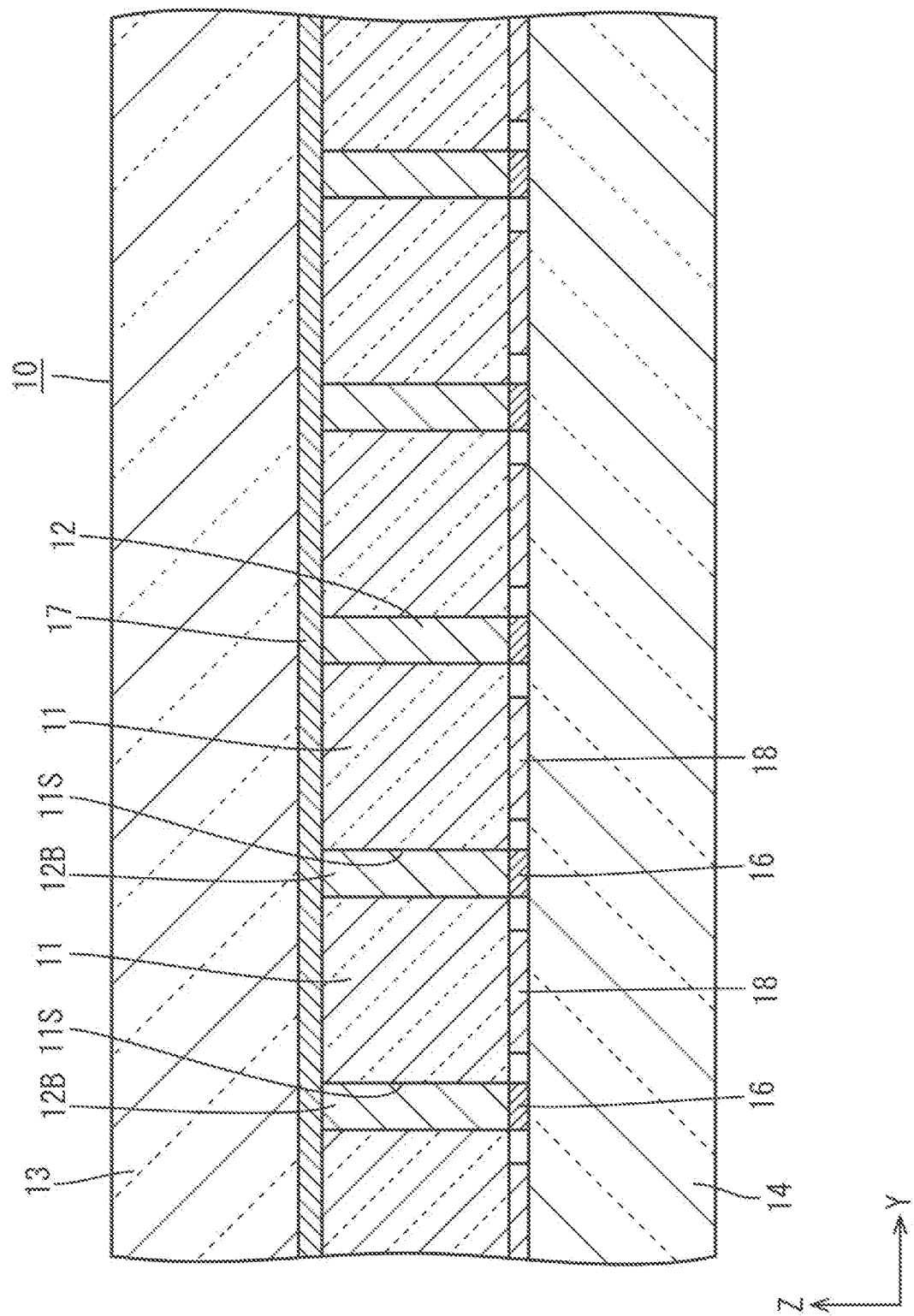
FIG. 7 is a cross-sectional view of the view angle control sheet taken along line C-C in FIG. 2.
Figure 8:
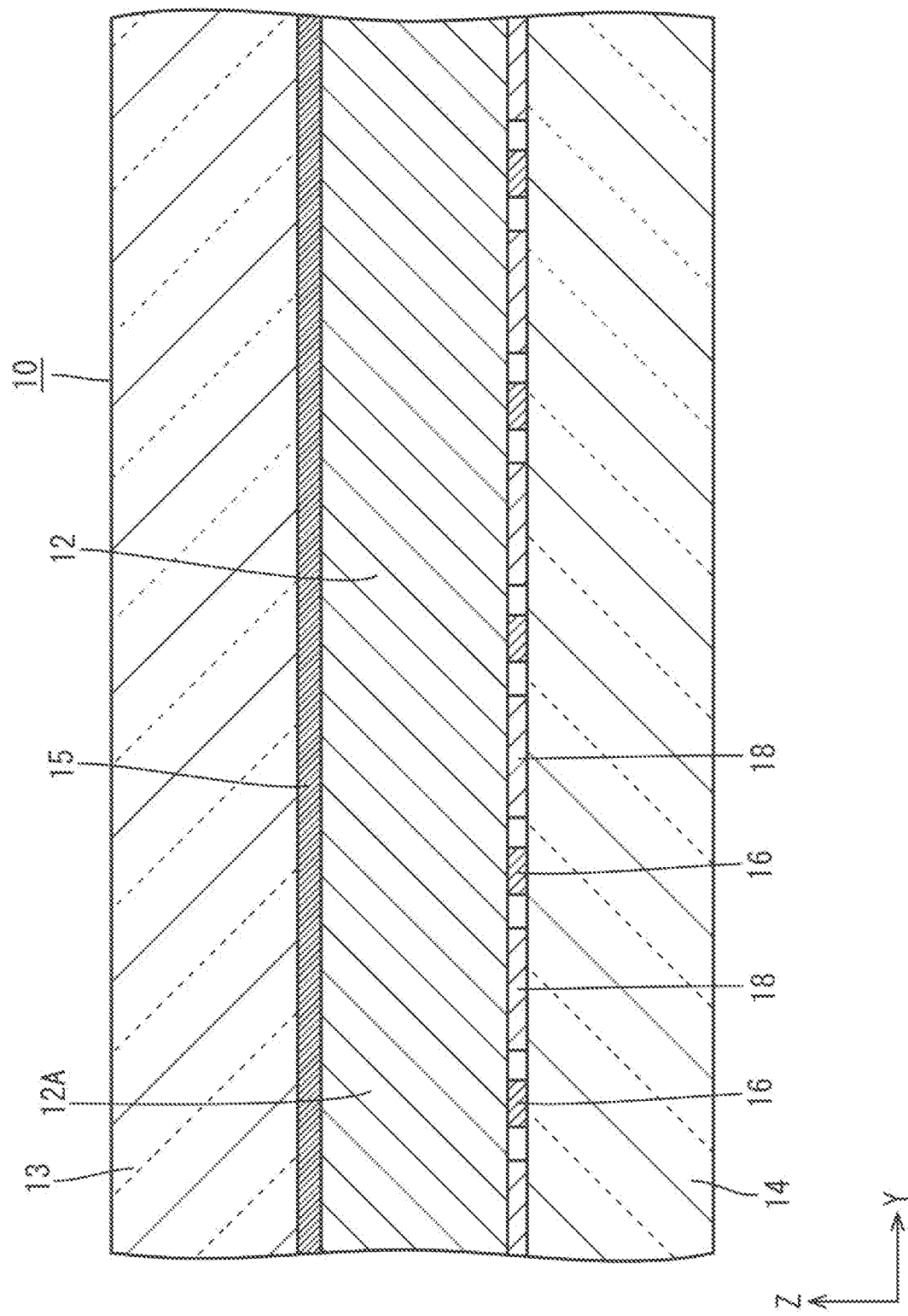
FIG. 8 is a cross-sectional view of the view angle control sheet taken along line D-D in FIG. 2.

As illustrated in FIG. 7, the second electrodes 16 overlap the second extending sections 12B that are included in the electrochromic layer 12 and extend parallel to the second electrodes 16, and the second electrodes 16 are contacted with back surfaces of the second extending sections 12B that are opposite surfaces from the surfaces that are contacted with the first electrodes 15 and the third electrodes 17. Each of the second electrodes 16 has a width dimension that is equal to a width dimension of the second extending section 12B and is contacted with the second extending section 12B over an entire width surface thereof. As illustrated in FIG. 8, the fourth electrodes 18 do not overlap the second electrodes 16 but overlap the light transmission layers 11 that are adjacent to the second extending sections 12B with respect to the Y-axis direction and also overlap portions of the first extending sections 12A except for the portions thereof crossing the second extending sections 12B. The fourth electrodes 18 are contacted with back surfaces of the overlapped portions. Each of the fourth electrodes 18 has a width dimension that is smaller than a width dimension of the light transmission layer 11. The back surfaces of the first extending sections 12A are contacted with the second electrodes 16 in addition to the fourth electrodes 18.

According to such a configuration, the first extending sections 12A and the second extending sections 12B included in the electrochromic layer 12 exert black due to an oxidation-reduction reaction caused by potential difference created between the first and third electrodes 15, 17 and the second and fourth electrodes 16, 18 according to the current flow between the electrodes 15, 17 and the electrodes 16, 18 that sandwich the electrochromic layer 12. Thus, the first extending sections 12A and the second extending sections 12B become in the light blocking state. The first extending sections 12A of the electrochromic layer 12 become in the light blocking state according to the current flow between the first electrodes 15 and each of the second electrodes 16 and the fourth electrodes 18. The second extending sections 12B of the electrochromic layer 12 become in the light blocking state according to the current flow between the second electrodes 16 and each of the first electrodes 15 and the third electrodes 17. On the other hand, if both of the first and third electrodes 15, 17 and the second and fourth electrodes 16, 18 are supplied with no current or one of the first, third electrodes 15, 17 and the second, fourth electrodes 16, 18 are supplied with current and another one are supplied with no current, the oxidation-reduction reaction is not caused and the light transmissive state is maintained in the first extending sections 12A and the second extending sections 12B of the electrochromic layer 12.

The view angle control sheet 10 according to the present embodiment has the above configuration. Next, operations of the view angle control sheet 10 used in combination with a display device will be described with reference to FIGS. 9 to 12. FIGS. 9 to 12 illustrate plan views illustrating portions of the light transmission layers 11 and the electrochromic layer 12 of the view angle control sheet 10. In FIGS. 9 to 12, those of the first extending sections 12A and the second extending sections 12B that are in the light blocking state are illustrated with shading.

Figure 9:
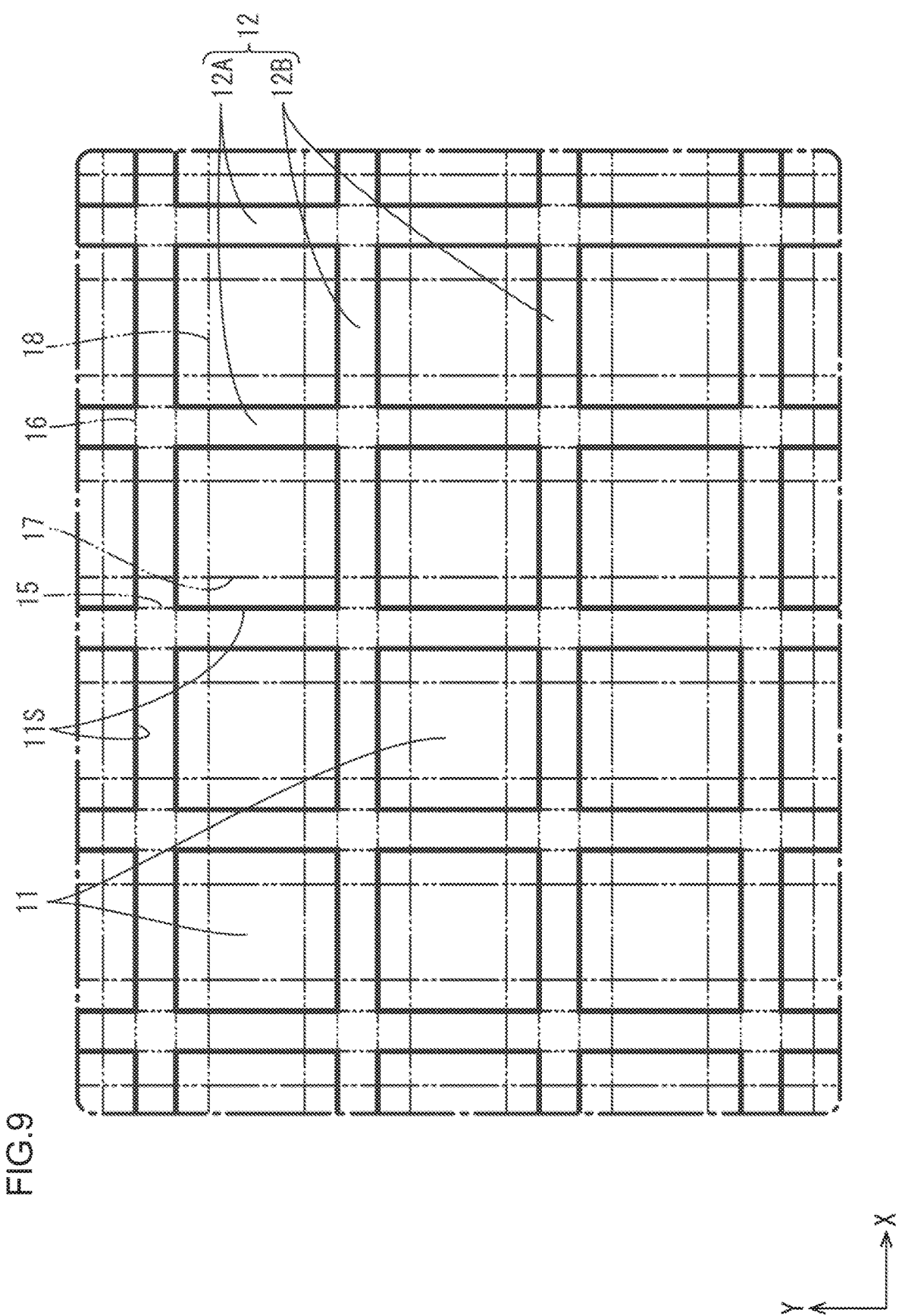
FIG. 9 is a plan view illustrating a portion of the light transmission layers and the electrochromic layer in which an entire area of the electrochromic layer is in a light transmissive state.

When a user of the display device sees an image displayed on the display device without restricting the view angle, each of the electrode connecting sections 19 to 22 is supplied with no current and each of the electrodes 15 to 18 is supplied with no current. In this state, no voltage is applied to the first extending sections 12A and the second extending sections 12B of the electrochromic layer 12 and the oxidation-reduction reaction is not caused, and the first extending sections 12A and the second extending sections 12B are in the light transmissive state, as illustrated in FIG. 9. When the first extending sections 12A and the second extending sections 12B are in the light transmissive state, an incident angle of light passing through the light transmission layers 11 with respect to the plate surface of the view angle control sheet 10 is not limited in the X-axis direction and the Y-axis direction. Therefore, a user can see an image displayed on the display device without being affected by any restriction of the view angle in the X-axis direction and the Y-axis direction.

Figure 10:
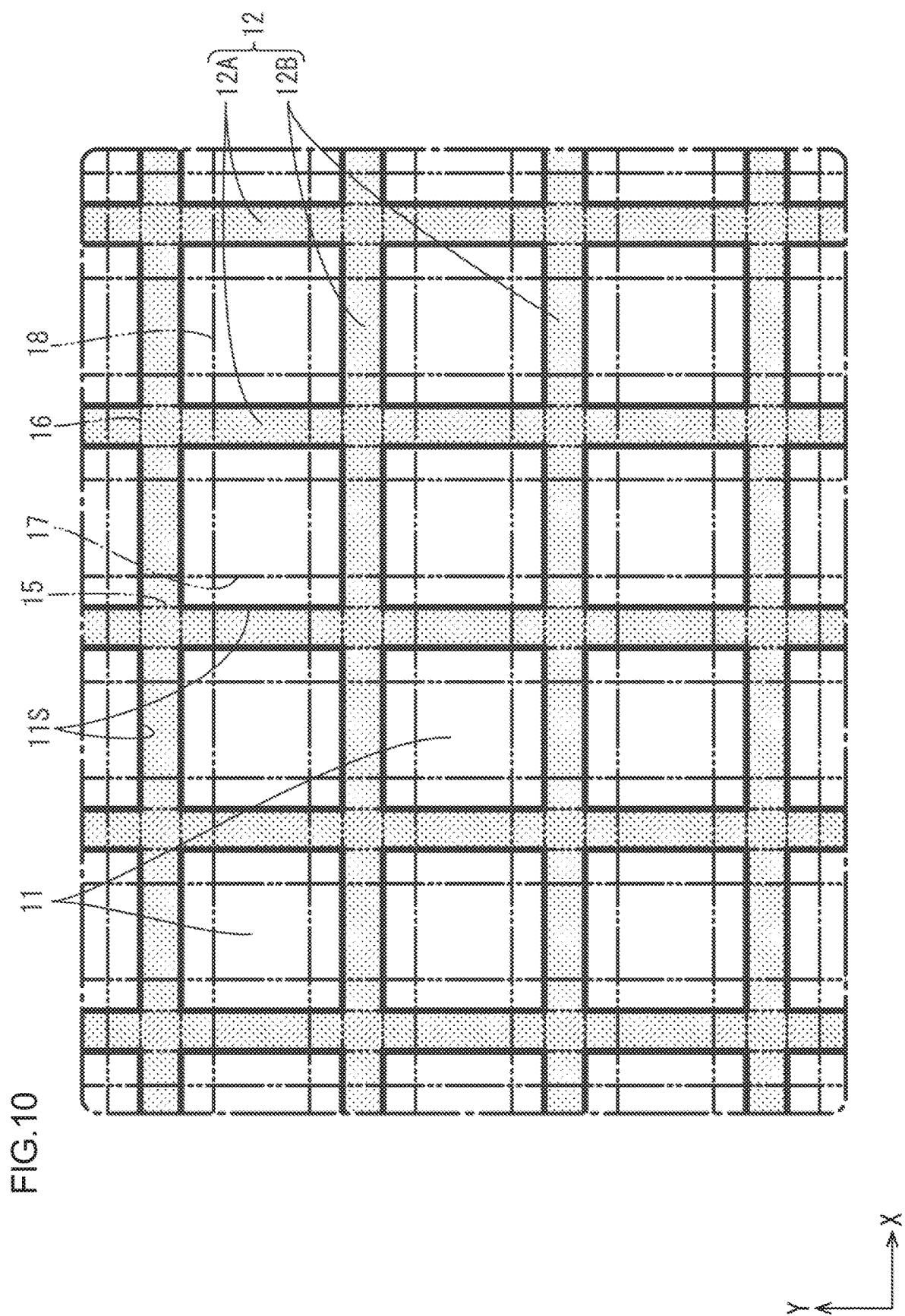
FIG. 10 is a plan view illustrating a portion of the light transmission layers and the electrochromic layer in which entire area of the electrochromic layer is in a light blocking state.

On the other hand, when a user sees an image displayed on the display device while restricting the view angle with respect to the X-axis direction and the Y-axis direction, each of the electrode connecting sections 19 to 22 is supplied with current and each of the electrodes 15 to 18 is supplied with current. In this state, voltage is applied to both of the first extending sections 12A and the second extending sections 12B of the electrochromic layer 12 and the oxidation-reduction reaction is caused, and the first extending sections 12A and the second extending sections 12B are in the light blocking state, as illustrated in FIG. 10. When both of the first extending sections 12A and the second extending sections 12B are in the light blocking state, the incident angle of light passing through the light transmission layers 11 with respect to the plate surface of the view angle control sheet 10 is restricted in the X-axis direction and the Y-axis direction. Therefore, a user can see an image displayed on the display device while the view angle being restricted in the X-axis direction and the Y-axis direction.

Figure 11:
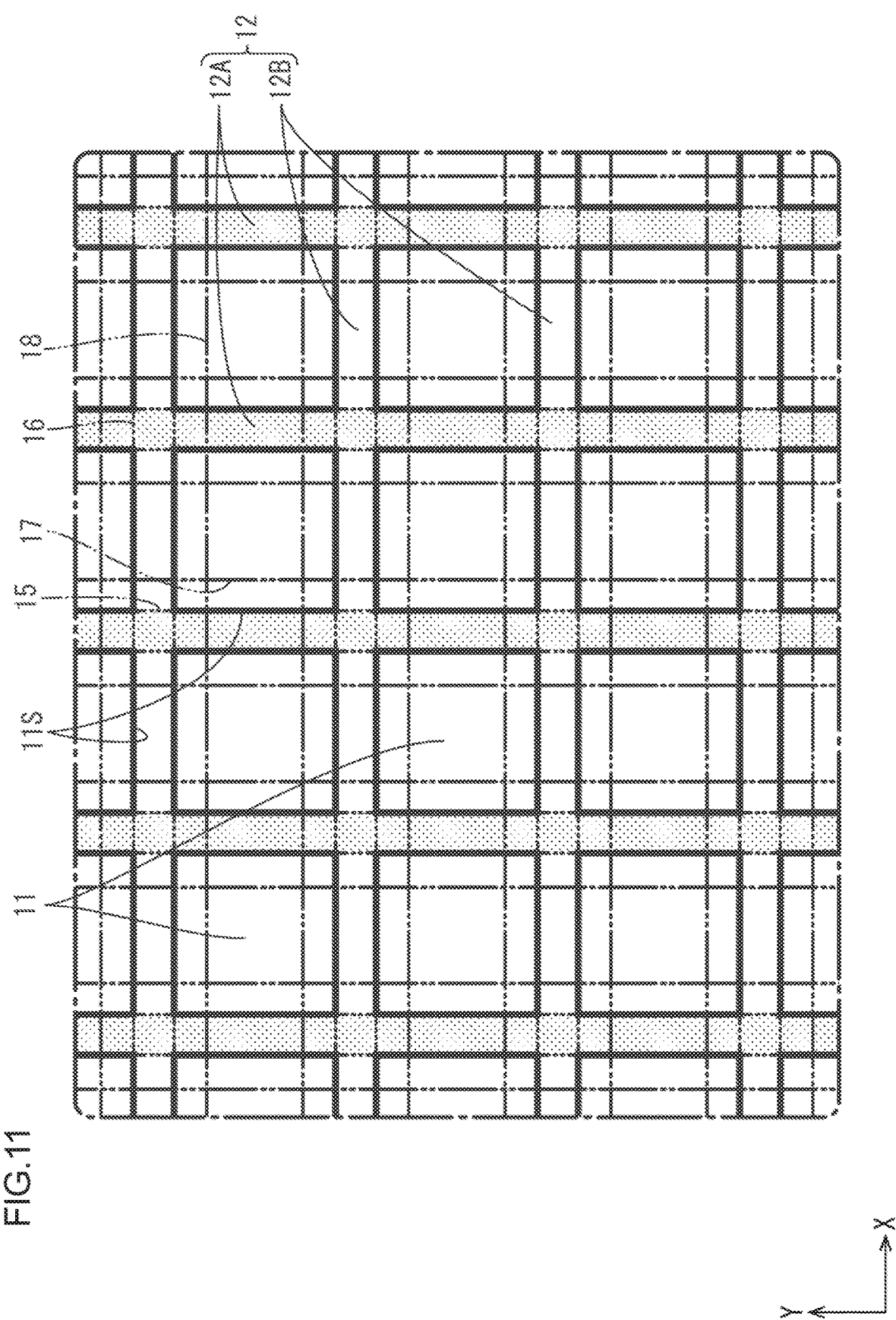
FIG. 11 is a plan view illustrating a portion of the light transmission layer and the electrochromic layers in which first extending sections of the electrochromic layer are in the light blocking state.

Next, when a user sees an image displayed on the display device while restricting the view angle only with respect to the X-axis direction, the first electrode connecting section 19, the second electrode connecting section 20, and the fourth electrode connecting section 22 are supplied with current. Therefore, the first electrodes 15, the second electrodes 16, and the fourth electrodes 18 are supplied with current. The third electrode connecting section 21 is not supplied with current and therefore, the third electrodes 17 are not supplied with current. In this state, voltage is applied to the first extending sections 12A of the electrochromic layer 12 and therefore, the oxidation-reduction reaction is caused and the first extending sections 12A become in the light blocking state, as illustrated in FIG. 11. On the other hand, voltage is not applied to the second extending sections 12B of the electrochromic layer 12 and therefore, the oxidation-reduction reaction is not caused and the second extending sections 12B become in the light transmissive state. When the first extending sections 12A are in the light blocking state and the second extending sections 12B are in the light transmissive state, the incident angle of light passing through the light transmission layers 11 with respect to the plate surface of the view angle control sheet 10 is not restricted in the Y-axis direction but restricted only in the X-axis direction. Therefore, a user can see an image displayed on the display device while the view angle in the X-axis direction being selectively restricted.

Figure 12:
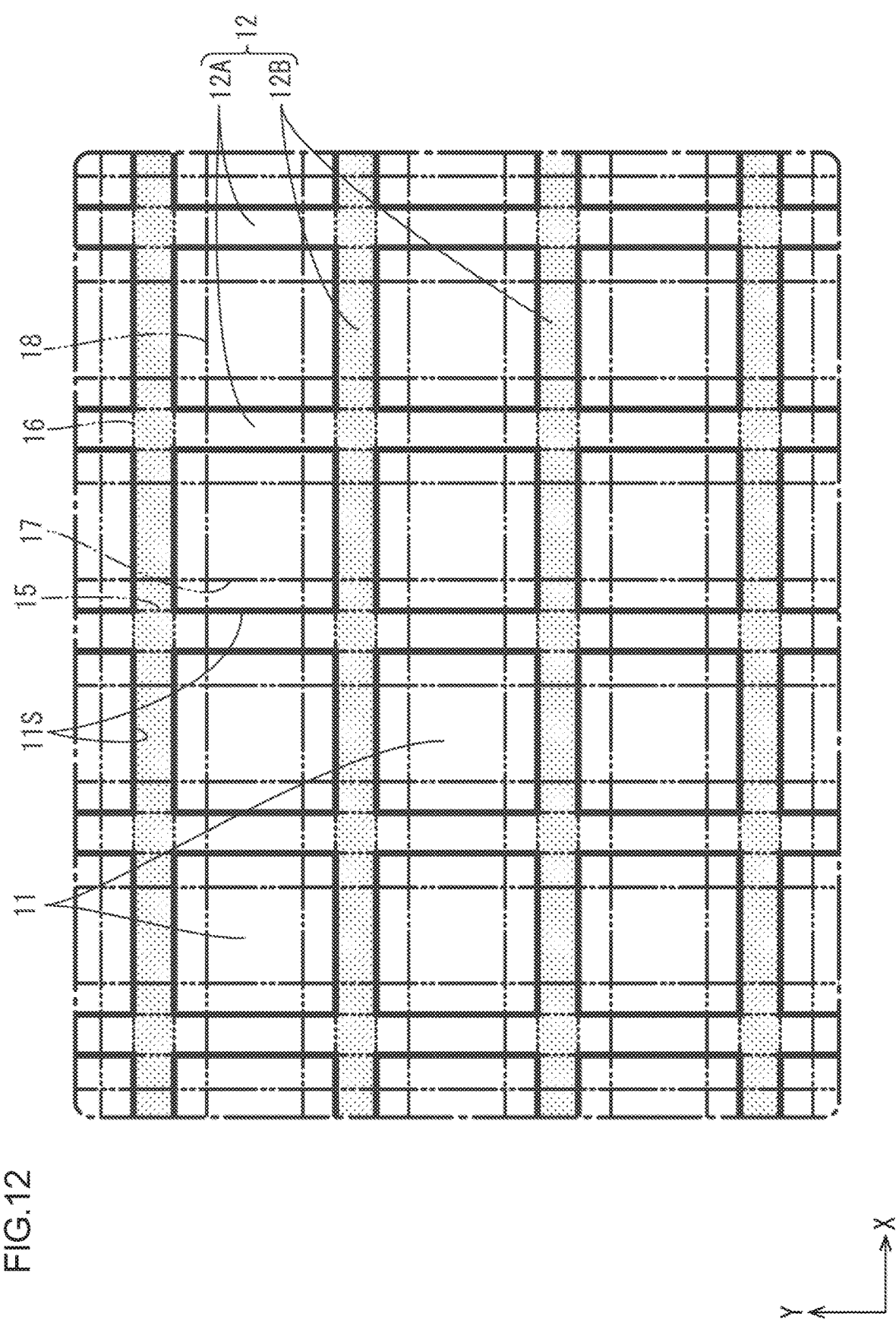
FIG. 12 is a plan view illustrating a portion of the light transmission layers and the electrochromic layer in which second extending sections of the electrochromic layer are in the light blocking state.

Next, when a user sees an image displayed on the display device while restricting the view angle only with respect to the Y-axis direction, the first electrode connecting section 19, the second electrode connecting section 20, and the third electrode connecting section 21 are supplied with current. Therefore, the first electrodes 15, the second electrodes 16, and the third electrodes 17 are supplied with current. The fourth electrode connecting section 22 is not supplied with current and therefore, the fourth electrodes 18 are not supplied with current. In this state, voltage is applied to the second extending sections 12B of the electrochromic layer 12 and therefore, the oxidation-reduction reaction is caused and the second extending sections 12B become in the light blocking state, as illustrated in FIG. 12. On the other hand, voltage is not applied to the first extending sections 12A of the electrochromic layer 12 and therefore, the oxidation-reduction reaction is not caused and the first extending sections 12B become in the light transmissive state. When the second extending sections 12B are in the light blocking state and the first extending sections 12A are in the light transmissive state, the incident angle of light passing through the light transmission layers 11 with respect to the plate surface of the view angle control sheet 10 is not restricted with respect to the X-axis direction but restricted only with respect to the Y-axis direction. Therefore, a user can see an image displayed on the display device while the view angle in the Y-axis direction being selectively restricted.

As described before, according to the view angle control sheet 10 of the present embodiment, any one of the following four kinds of view angle control patterns A to D can be selected as appropriate when a user sees an image displayed on a display device. A view angle control pattern A represents a state in which a view angle is not restricted with respect to both of the X-axis direction and the Y-axis direction (see FIG. 9). A view angle control pattern B represents a state in which a view angle is restricted with respect to both of the X-axis direction and the Y-axis direction (see FIG. 10). A view angle control pattern C represents a state in which a view angle is restricted selectively with respect to the X-axis direction (see FIG. 11). A view angle control pattern D represents a state in which a view angle is restricted selectively with respect to the Y-axis direction (see FIG. 12). Specifically, when a user uses a display device while being seated in one of seats that are arranged laterally, the user selects the view angle control pattern C among the four view angle control patterns A to D such that the image cannot be seen by a person who is seated in a seat next to the user's seat. When a user uses the display device in a car, the user selects the view angle control pattern D among the four view angle control patterns A to D such that the image is not projected on a front glass of the car. Thus, the view angle of the image displayed on the display device can be restricted or not according to a user's using situation and convenience is improved. Using modes of the display device include a normal using mode in which the view angle is not restricted and a temporary using mode in which the view angle is restricted, and the electrodes 15 to 18 are supplied with no current in the normal using mode. This is preferable for reducing power consumption. Furthermore, the first and third electrodes 15, 17 and the second and fourth electrodes 16, 18 are disposed on opposite sides with respect to the electrochromic layer 12 and the light transmission layers 11. Therefore, compared to the conventional configuration in which the electrochromic layer 12 and the light transmission layers 11 are included in two layers, the view angle control sheet 10 can be reduced in thickness and the producing process is simplified and the productivity is improved.

As described before, the view angle control sheet (the view angle control device) 10 according to the present embodiment includes the electrochromic layer 12, the light transmission layers 11, the first electrodes 15, the second electrodes 16, the third electrodes 17, and the fourth electrodes 18. The electrochromic layer 12 has light absorption spectrum characteristics according to voltages applied thereto and includes the first extending sections 12A that extend in the first direction and the second extending sections 12B that extend in the second direction crossing the first direction. Each of the light transmission layers 11 is defined by the first extending sections 12A and the second extending sections 12B and light is transmitted therethrough. The first electrodes 15 are disposed on one side of the electrochromic layer 12 and the light transmission layers 11 and overlap the first extending sections 12A, respectively, and are contacted with the first extending sections 12A, respectively. The second electrodes 16 are disposed on an opposite side from the first electrodes 15 with respect to the electrochromic layer 12 and the light transmission layers 11 and overlap the second extending sections 12B, respectively, and are contacted with the second extending sections 12B, respectively. The third electrodes 17 are disposed on a same side as the first electrodes 15 with respect to the electrochromic layer 12 and the light transmission layers 11 and the third electrodes 17 do not overlap the first electrodes 15 but overlap the second extending sections 12B, respectively, and are contacted with the second extending sections 12B, respectively. The fourth electrodes 18 are disposed on a same side as the second electrodes 16 with respect to the electrochromic layer 12 and the light transmissive layers 11, and the fourth electrodes 18 do not overlap the second electrodes 16 but overlap the first extending sections 12A, respectively.

Thus, the light absorption spectrum characteristics of the first extending sections 12A and the second extending sections 12B of the electrochromic layer 12 are varied according to voltages applied to the respective first electrodes 15 to the fourth electrodes 18. For example, if all of the first electrodes 15 to the fourth electrodes 18 are supplied with current or no current, both of the first extending sections 12A and the second extending sections 12B become in a high optical absorptance state or in a low optical absorptance state. If the optical absorptance of both of the first extending sections 12A and the second extending sections 12B is low, the angle of light rays that pass through the light transmission layers 11 is not limited in the first direction and the second direction and therefore, the view angle is not restricted with respect to the first direction and the second direction. On the other hand, if the optical absorptance of both of the first extending sections 12A and the second extending sections 12B is high, the angle of light rays that pass through the light transmission layers 11 is limited in the first direction and the second direction and therefore, the view angle is restricted with respect to the first direction and the second direction.

If the first electrodes 15, the second electrodes 16, and the fourth electrodes 18 are supplied with current and the third electrodes 17 are supplied with no current, the first extending sections 12A that are sandwiched between the first electrodes 15 and the fourth electrodes 18 both supplied with current are in the high optical absorptance state or in the low optical absorptance state, and the second extending sections 12B that are sandwiched between the second electrodes 16 supplied with current and the third electrodes 17 supplied with no current have light absorption spectrum characteristics opposite from those of the first extending sections 12A. Further, if the first electrodes 15, the second electrodes 16, and the third electrodes 17 are supplied with current and the fourth electrodes 18 are supplied with no current, the second extending sections 12B that are sandwiched between the second electrodes 16 and the third electrodes 17 both supplied with current are in the high optical absorptance state or in the low optical absorptance state, and the first extending sections 12A that are sandwiched between the first electrodes 15 supplied with current and the fourth electrodes 18 supplied with no current have light absorption spectrum characteristics opposite from those of the second extending sections 12B. If the optical absorptance is low in the second extending sections 12B and the optical absorptance is high in the first extending sections 12A, the angle of light that passes through the light transmission layers 11 is limited only with respect to the second direction, and therefore, the view angle is restricted selectively with respect to the second direction. If the optical absorptance is low in the first extending sections 12A and the optical absorptance is high in the second extending sections 12B, the angle of light that passes through the light transmission layers 11 is limited only with respect to the first direction, and therefore, the view angle is restricted selectively with respect to the first direction.

As described before, the view angle can be restricted selectively with respect to one of the first direction and the second direction. Further, the first electrodes 15 and the third electrodes 17 are disposed on opposite side from the second electrodes 16 and the fourth electrodes 18 with respective to the electrochromic layer 12 and the light transmission layers 11. According to such a configuration, compared to the conventional configuration including the electrochromic layer 12 and the light transmission layers 11 in two layers, the thickness can be reduced.

The electrochromic layer 12 is configured such that the first extending sections 12A and the light transmission layers 11 are arranged alternately in the second direction and the second extending sections 12B and the light transmission layers 11 are arranged alternately in the first direction. The first electrodes 15 and the third electrodes 17 extend in the first direction and are arranged alternately in the second direction, and the second electrodes 16 and the fourth electrodes 18 extend in the second direction and are arranged alternately in the first direction. According to such a configuration, the angle of light rays that pass through the light transmission layers 11 can be restricted independently with respect to the first direction or the second direction.

The first electrode connecting section 19 that is connected to and short-circuits the first electrodes 15 and the second electrode connecting section 20 that is connected to and short-circuits the second electrodes 16 are included. According to such a configuration, the first electrodes 15 can be collectively supplied with current by supplying voltage to the first electrode connecting section 19. Similarly, the second electrodes 16 can be collectively supplied with current by supplying voltage to the second electrode connecting section 20. Thus, a circuit configuration for controlling supply of current or no supply of current to the first electrodes 15 and the second electrodes 16 can be simplified.

The third electrode connecting section 21 that is connected to and short-circuits the third electrodes 17 and the fourth electrode connecting section 22 that is connected to and short-circuits the fourth electrodes 18 are included. According to such a configuration, the third electrodes 17 can be collectively supplied with current by supplying voltage to the third electrode connecting section 21. Similarly, the fourth electrodes 18 can be collectively supplied with current by supplying voltage to the fourth electrode connecting section 22. Thus, a circuit configuration for controlling supply of current or no supply of current to the third electrodes 17 and the fourth electrodes 18 can be simplified.

The electrochromic layer 12 has light absorption spectrum characteristics such that the optical absorptance is increased when current is supplied thereto compared to a case when no current is supplied. Accordingly, when the device is used while the view angle being not restricted, the electrodes 15 to 18 are not necessary to be supplied with current. Therefore, if using of the device while restricting the view angle is only temporal, the power consumption can be reduced.

The first substrate 13 and the second substrate 14 are provided. The first electrodes 15 and the third electrodes 17 are formed on the plate surface of the first substrate 13 and are sandwiched between the first substrate 13 and each of the electrochromic layer 12 and the light transmission layers 11. The second electrodes 16 and the fourth electrodes 18 are formed on the plate surface of the second substrate 14 and are sandwiched between the second substrate 14 and each of the electrochromic layer 12 and the light transmission layers 11. According to such a configuration, in the producing, the first electrodes 15 and the third electrodes 17 are formed on the plate surface of the first substrate 13 and the second electrodes 16 and the fourth electrodes 18 are formed on the plate surface of the second substrate 14 and then, the first substrate 13 and the second substrate 14 are disposed to sandwich the electrochromic layer 12 and the light transmission layers 11 therebetween. The electrodes 15 to 18 are formed easily and the first electrodes 15 are positioned corresponding to the respective first extending sections 12A easily and the electrodes 16 are positioned corresponding to the respective second extending sections 12B easily and therefore, the productivity is preferably improved.

Second Embodiment

A second embodiment will be described with reference to FIGS. 13 to 18. The second embodiment includes a first electrode driving section 23 and a second electrode driving section 24. Configurations, functions, and effects similar to those of the first embodiment will not be described.

Figure 13:
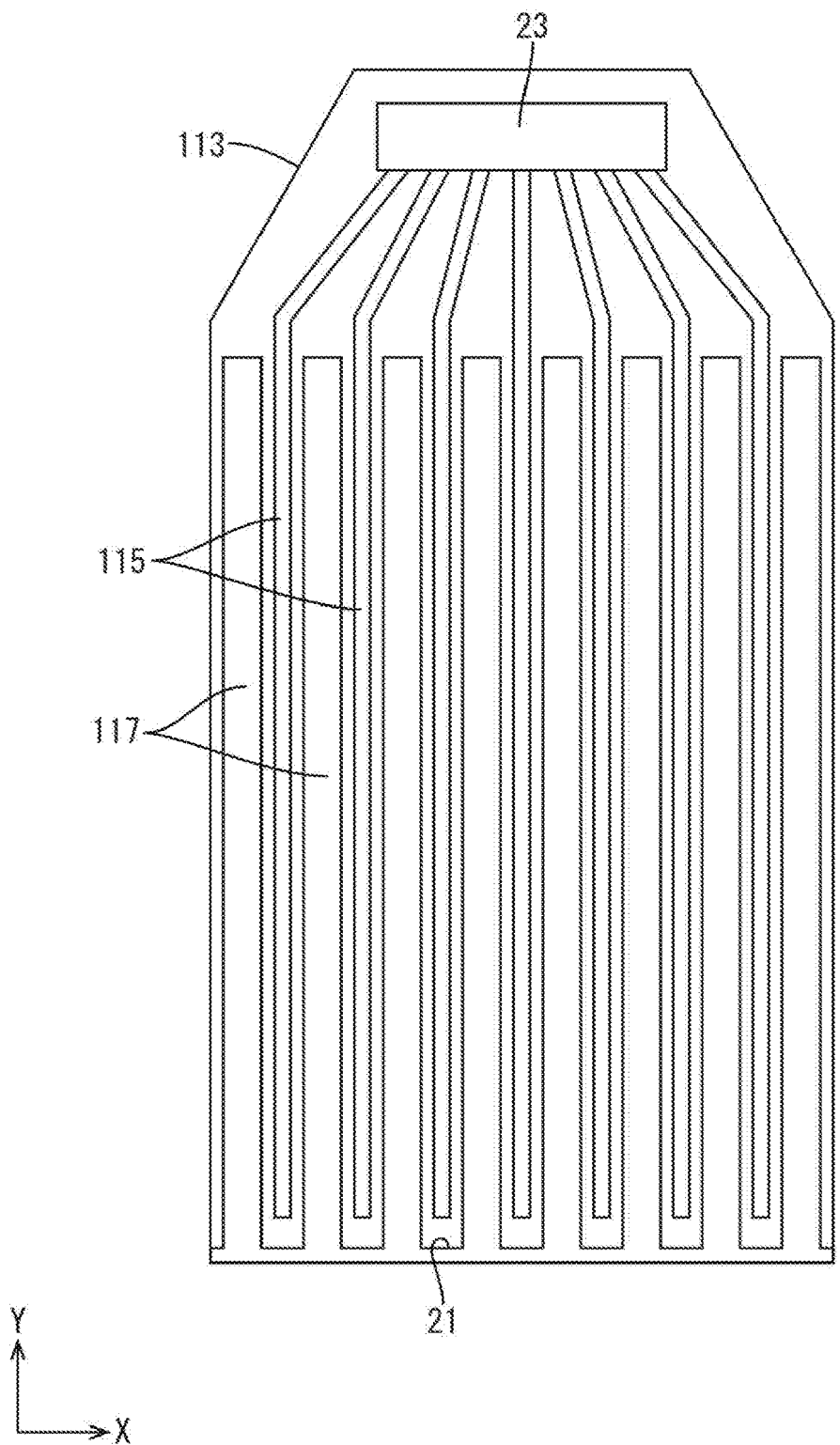
FIG. 13 is a bottom view of a first substrate included in a view angle control sheet according to a second embodiment.
Figure 14:
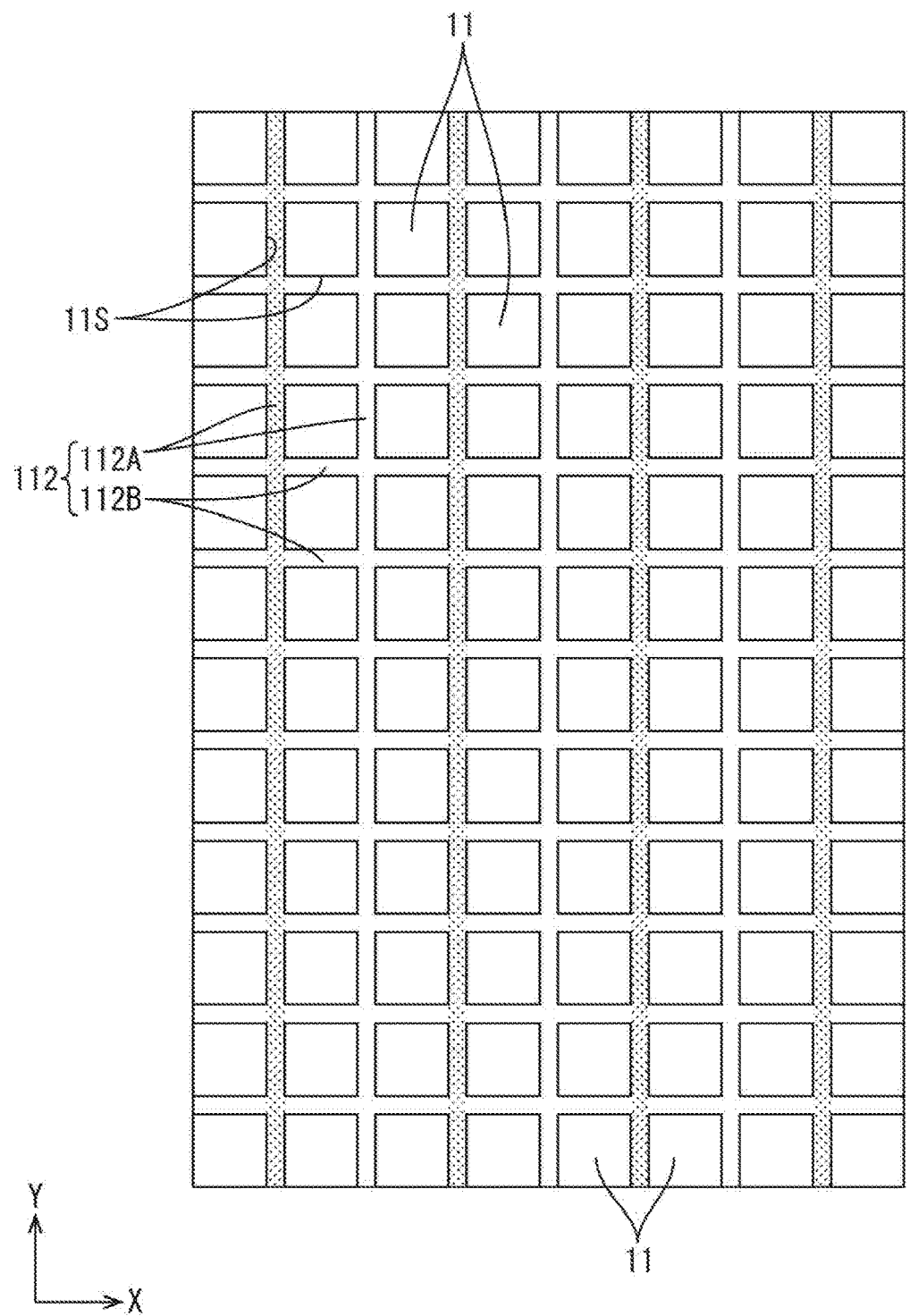
FIG. 14 is a plan view of light transmission layers and an electrochromic layer included in the view angle control sheet and illustrating a portion of first extending sections of the electrochromic layer that is in the light blocking state.

As illustrated in FIG. 13, a first substrate 113 of a view angle control sheet 110 according to the present embodiment includes the first electrode driving section 23 that is connected to first electrodes 115 and can supply current to each of the first electrodes 115 independently. The first electrode driving section 23 is mounted on an extended portion that is extended from one edge of the first substrate 113 with respect to the Y-axis direction. The first electrode driving section 23 is a LSI chip that includes a drive circuit therein and is activated based on signals supplied from a signal supply source to selectively drive the first electrodes 115. Specifically, in the present embodiment, the first electrode driving section 23 is configured to drive all of the first electrodes 115 collectively and also configured to selectively supply current to ones of the first electrodes 115 and not to supply current to another ones of the first electrodes 115 such that the one first electrodes 115 and the other first electrodes 115 are arranged alternately. If the third electrodes 117 are not supplied with current and all of the second electrodes 116 and the fourth electrodes 118 are supplied with current while about a half number of the first electrodes 115 being supplied with current by the first electrode driving section 23, among the first extending sections 112A of the electrochromic layer 112, ones that overlap the first electrodes 115 supplied with current are made selectively in the light blocking state and another ones that overlap the first electrodes 115 supplied with no current are made selectively in the light transmissive state. Namely, the first extending sections 112A that are to be in the light blocking state and those that are to be in the light transmissive state are alternately arranged. The view angle is small when all of the first extending sections 112A are in the light blocking state and the view angle is large when all of the first extending sections 112A are in the light transmissive state. The view angle is an intermediate degree between the small view angle and the large view angle when about a half number of the first extending sections 112A are in the light blocking state. In FIG. 14, those of the first extending sections 112A that are in the light blocking state are illustrated with shading. Since the present embodiment includes the first electrode driving section 23, the first electrode connecting section 19 (see FIG. 3) of the first embodiment is not included.

Figure 15:
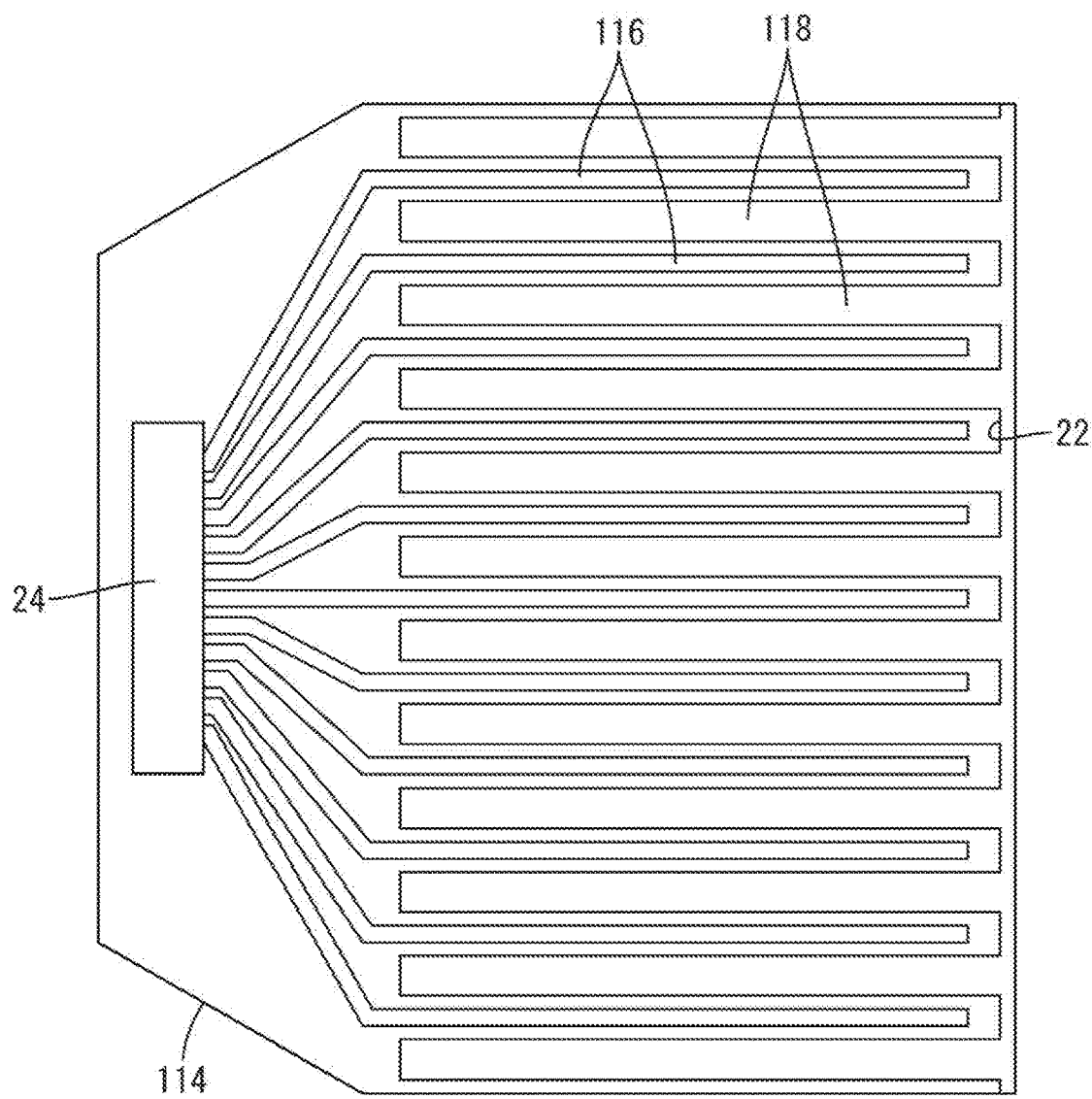
FIG. 15 is a plan view of a second substrate included in the view angle control sheet.
Figure 16:
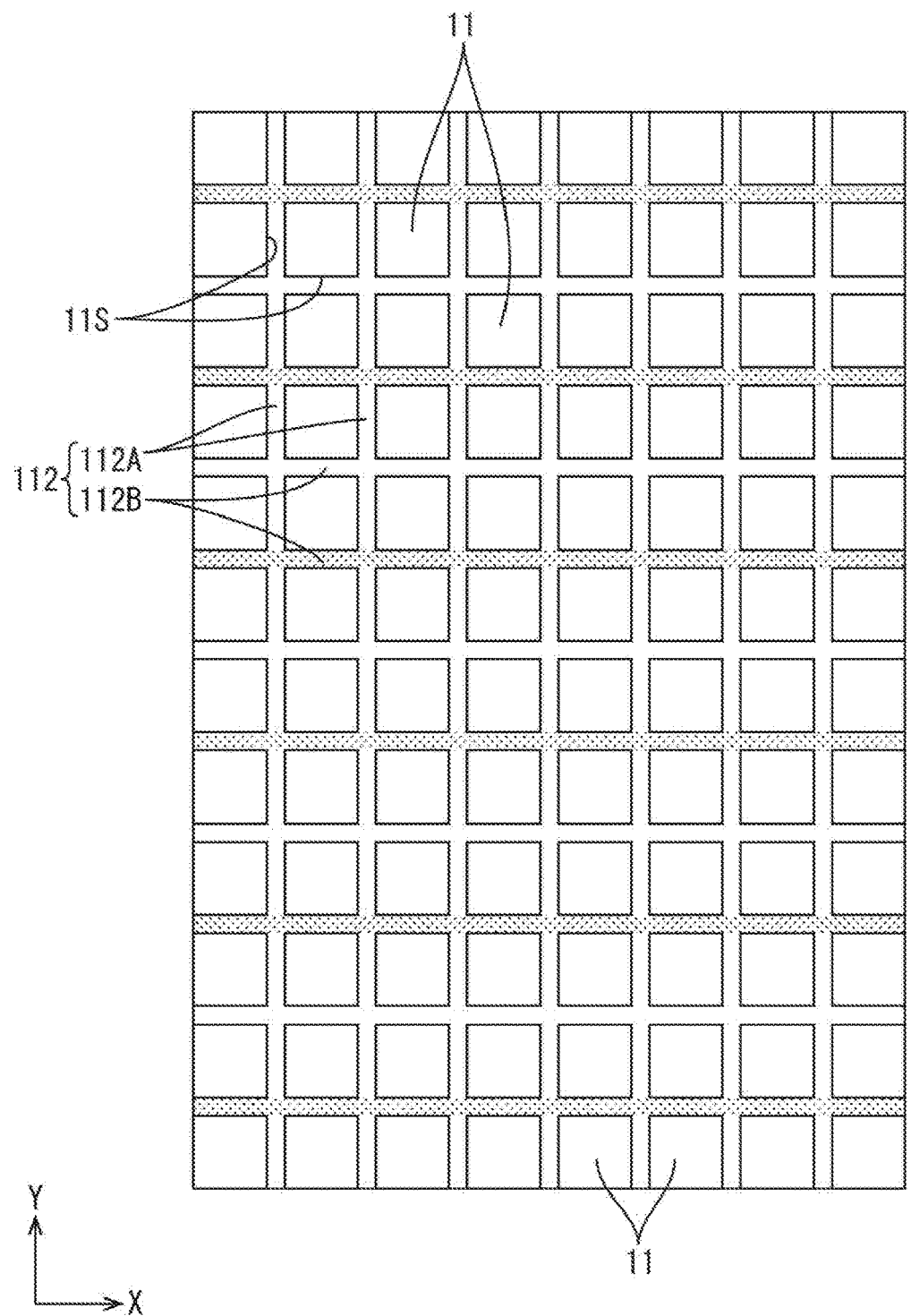
FIG. 16 is a plan view of the light transmission layers and the electrochromic layer included in the view angle control sheet and illustrating a portion of second extending sections of the electrochromic layer that is in the light blocking state.

On the other hand, as illustrated in FIG. 15, a second substrate 114 includes the second electrode driving section 24 that is connected to second electrodes 116 and can supply current to each of the second electrodes 116 independently. The second electrode driving section 24 is mounted on an extended portion that is extended from one edge of the second substrate 114 with respect to the X-axis direction. The second electrode driving section 24 is a LSI chip similar to that of the first electrode driving section 23 and is configured to selectively drive the second electrodes 116. Specifically, in the present embodiment, the second electrode driving section 24 is configured drive all of the second electrodes 116 collectively and also configured to selectively supply current to ones of the second electrodes 116 and not to supply current to another ones of the second electrodes 116 such that the one second electrodes 116 and the other second electrodes 116 are arranged alternately. If the fourth electrodes 118 are not supplied with current and all of the first electrodes 115 and the third electrodes 117 are supplied with current while about a half number of the second electrodes 116 being supplied with current by the second electrode driving section 24, among the second extending sections 112B of the electrochromic layer 112, ones that overlap the second electrodes 116 supplied with current are made selectively in the light blocking state and another ones that overlap the second electrodes 116 supplied with no current are made selectively in the light transmissive state. Namely, the second extending sections 112B that are to be in the light blocking state and those that are to be in the light transmissive state are alternately arranged. The view angle is small when all of the second extending sections 112B are in the light blocking state and the view angle is large when all of the second extending sections 112B are in the light transmissive state. The view angle is an intermediate degree between the small view angle and the large view angle when about a half number of the second extending sections 112B are in the light blocking state. In FIG. 16, those of the second extending sections 112B that are in the light blocking state are illustrated with shading. Since the present embodiment includes the second electrode driving section 24, the second electrode connecting section 20 (see FIG. 4) of the first embodiment is not included.

Figure 17:
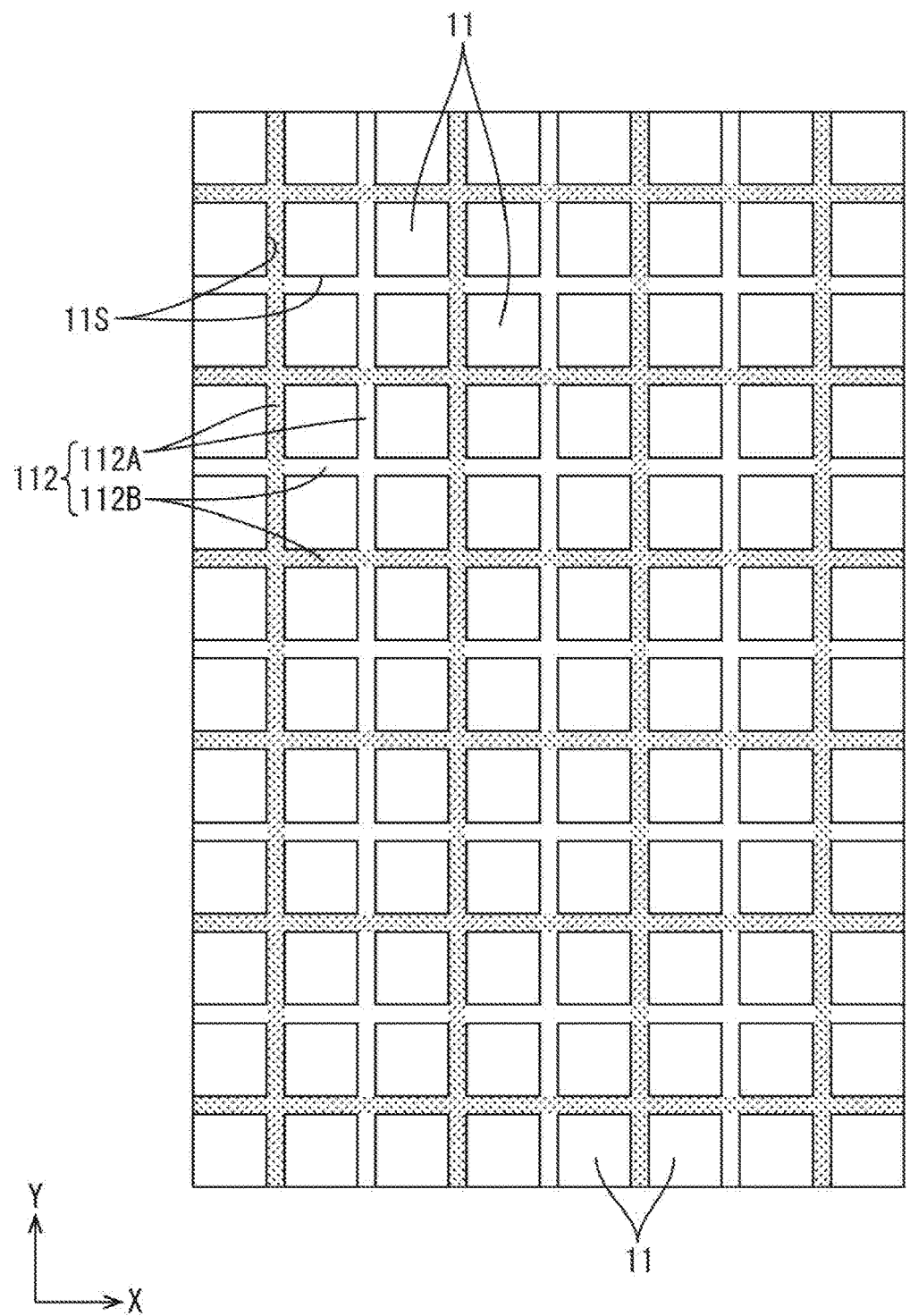
FIG. 17 is a plan view of the light transmission layers and the electrochromic layer included in the view angle control sheet and illustrating a portion of the first extending sections and a portion of the second extending sections of the electrochromic layer that are in the light blocking state.

If the first electrodes 115 are driven by the first electrode driving section 23 such that ones of the first electrodes 115 supplied with current and another ones supplied with no current are arranged alternately and the second electrodes 116 are driven by the second electrode driving section 24 such that ones of the second electrodes 116 supplied with current and another ones supplied with no current are arranged alternately, the first extending sections 112A and the second extending sections 112B of the electrochromic layer 112 are arranged such that those to be in the light blocking state and those to be in the light transmissive state are arranged alternately, as illustrated in FIG. 17. The view angle is small when all of the first extending sections 112A and the second extending sections 112B are in the light blocking state and the view angle is large when all of the first extending sections 112A and the second extending sections 112B are in the light transmissive state. The view angle is an intermediate degree between the small view angle and the large view angle when about a half number of the first extending sections 112A and about a half number of the second extending sections 112B are in the light blocking state. In FIG. 17, those of the first extending sections 112A and the second extending sections 112B that are in the light blocking state are illustrated with shading. Although not illustrated, if all of the second electrodes 116, the third electrodes 117, and the fourth electrodes 118 are supplied with current while about a half number of the first electrodes 115 being supplied with current by the first electrode driving section 23, those of the first extending sections 112A that overlap the first electrodes 115 supplied with current are selectively made in the light blocking state and those of the first extending sections 112A that overlap the first electrodes 115 supplied with no current are selectively made in the light transmissive state and all of the second extending sections 112B are made in the light blocking state. Although not illustrated, if all of the first electrodes 115, the third electrodes 117, and the fourth electrodes 118 are supplied with current while about a half number of the second electrodes 116 being supplied with current by the second electrode driving section 24, those of the second extending sections 112B that overlap the second electrodes 116 supplied with current selectively become in the light blocking state and those of the second extending sections 112B that overlap the second electrodes 116 supplied with no current selectively become in the light transmissive state and all of the first extending sections 112A become in the light blocking state.

Figure 18:
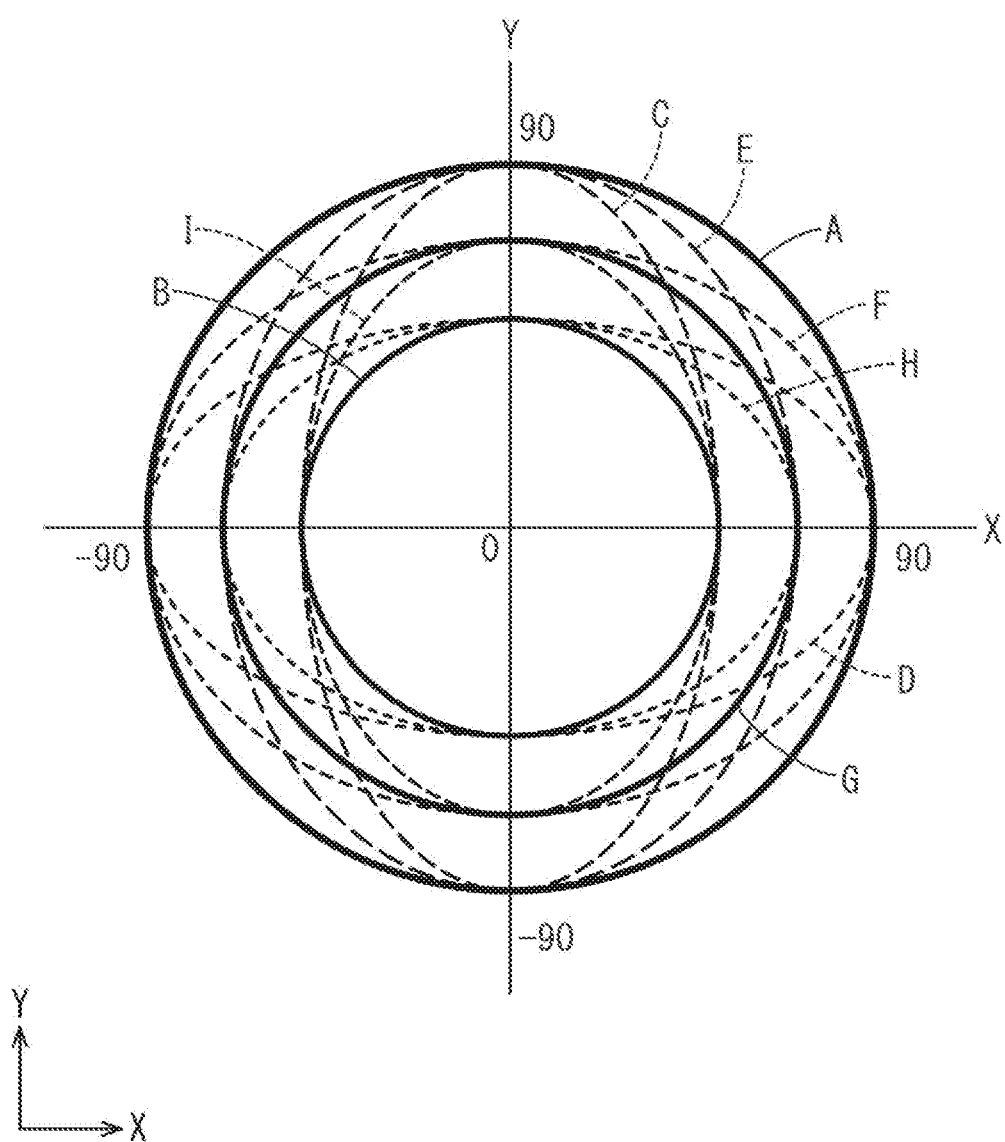
FIG. 18 is graphs representing view angle characteristics of the view angle control sheet.

As described before, according to the view angle control sheet 110 of the present embodiment, any one of nine kinds of view angle control patterns A to I illustrated in FIG. 18 can be selected as appropriate when a user sees an image displayed on a display device. FIG. 18 illustrates graphs representing view angle properties of the view angle control sheet 110, and a lateral axis represents angles of the view angle with respect to the X-axis direction (a unit is degree) and a vertical axis represents angles of the view angle with respect to the Y-axis direction (a unit is degree). A view angle control pattern A represents a state in which a view angle is not restricted with respect to the X-axis direction and the Y-axis direction (see FIG. 9). A view angle control pattern B represents a state in which the view angle is restricted to a maximum degree with respect to the X-axis direction and the Y-axis direction (see FIG. 10). A view angle control pattern C represents a state in which the view angle is restricted to a maximum degree selectively with respect to the X-axis direction (see FIG. 11). A view angle control pattern D represents a state in which the view angle is restricted to a maximum degree selectively with respect to the Y-axis direction (see FIG. 12). A view angle control pattern E represents a state in which the view angle is restricted selectively with respect to the X-axis direction and the view angle is an intermediate degree between the view angle control patterns A and C (see FIG. 14). A view angle control pattern F represents a state in which the view angle is restricted selectively with respect to the Y-axis direction and the view angle is an intermediate degree between the view angle control patterns A and D (see FIG. 16). A view angle control pattern G represents a state in which the view angle is restricted with respect to the X-axis direction and the Y-axis direction and the view angle with respect to the X-axis direction is an intermediate degree between the view angle control patterns A and C and the view angle with respect to the Y-axis direction is an intermediate degree between the view angle control patterns A and D (see FIG. 17). A view angle control pattern H represents a state in which the view angle is restricted with respect to the X-axis direction and the Y-axis direction and the view angle with respect to the X-axis direction is an intermediate degree between the view angle control patterns A and C and the view angle with respect to the Y-axis direction is restricted to a maximum degree. A view angle control pattern I represents a state in which the view angle is restricted with respect to the X-axis direction and the Y-axis direction and the view angle with respect to the X-axis direction is restricted to a maximum degree and the view angle with respect to the Y-axis direction is an intermediate degree between the view angle control patterns A and D. Thus, in the present embodiment, a most appropriate one of the nine kinds of view angle control patterns A to I can be selected according to a user's using situation and the view angle of the image displayed on the display device can be adjusted more precisely and convenience is further improved.

As described before, the present embodiment includes the first electrode driving section 23 that is connected to each of the first electrodes 115 and can supply current to each of the first electrodes 115 separately, and the second electrode driving section 24 that is connected to each of the second electrodes 116 and can supply current to each of the second electrodes 116 separately. Accordingly, a specific one of the first electrodes 115 can be supplied with current and the rest of the first electrodes 115 are not supplied with current by the first electrode driving section 23. Similarly, a specific one of the second electrodes 116 can be supplied with current and the rest of the second electrodes 116 are not supplied with current by the second electrode driving section 24. The variation in controlling a view angle with respect to the first direction and the second direction is increased.

The first electrodes 115 can be driven by the first electrode driving section 23 such that those of the first electrodes 115 supplied with current and those supplied with no current are arranged alternately and the second electrodes 116 can be driven by the second electrode driving section 24 such that those of the second electrodes 116 supplied with current and those supplied with no current are arranged alternately. Accordingly, the first electrodes 115 can be driven by the first electrode driving section 23 such that all of the first electrodes 115 are supplied with current or supplied with no current or the first electrodes 115 supplied with current and those supplied with no current are alternately arranged. Similarly, the second electrodes 116 can be driven by the second electrode driving section 24 such that all of the second electrodes 116 are supplied with current or supplied with no current or the second electrodes 116 supplied with current and those supplied with no current are alternately arranged. Accordingly, the view angle may be restricted or may not be restricted with respect to the first direction and the second direction and further may be restricted to be an intermediate degree.

Other Embodiments

The present technology is not limited to the embodiments described in the above descriptions and drawings. The following embodiments may be included in the technical scope.

(1) In each of the above embodiments, the first electrodes and the third electrodes extend in the Y-axis direction, and the second electrodes and the fourth electrodes extend in the X-axis direction. However, the first electrodes and the third electrodes may extend in the X-axis direction and the second electrodes and the fourth electrodes may extend in the Y-axis direction. In such a configuration, the X-axis direction corresponds to the first direction that is an extending direction of the first electrodes and the third electrodes, and the Y-axis direction corresponds to the second direction that is an extending direction of the second electrodes and the fourth electrodes.

(2) In each of the above embodiments, the electrochromic layer is formed in a grid and the first extending sections and the second extending sections are connected to each other at intersections thereof. However, the electrochromic layer may be configured such that the first extending sections and the second extending sections are not connected to each other. In such a configuration, entire areas of the first extending sections may not overlap the second electrodes or entire areas of the second extending sections may not overlap the first electrodes.

(3) In each of the above embodiments, the first extending section and the light transmission layer are arranged alternately in the X-axis direction. However, the first extending sections and the light transmission layers may be arranged alternately in the X-axis direction. Similarly, the second extending section and the light transmission layer are arranged alternately in the Y-axis direction; however, the second extending sections and the light transmission layers may be arranged alternately in the Y-axis direction.

(4) In the second embodiment, the first electrodes are driven by the first electrode driving section such that the first electrodes supplied with current and those supplied with no current are alternately arranged. However, the first electrodes may be driven by the first electrode driving section such that multiple first electrodes supplied with no current are arranged between the first electrodes supplied with current. Similarly, the second electrodes may be driven by the second electrode driving section such that multiple second electrodes supplied with no current are arranged between the second electrodes supplied with current. According to such a configuration, the number of the view angle control patterns can be increased.

(5) In each of the above embodiments, the view angle control sheet has a plate surface. If a display panel of a display device that includes the view angle sheet has a curved display surface, a plate surface of the view angle control sheet may be preferably curved along the display surface. In such a case, the first substrate and the second substrate that are included in the view angle control sheet may be preferably made of synthetic resin material to provide them with flexibility. Other than that, the first substrate and the second substrate that are included in the view angle control sheet may be made of glass to provide them with flexibility by adjusting thickness thereof.

(6) Each of the above embodiments includes the electrochromic layers that are substantially transparent when supplied with no current; however, electrochromic layers that are not transparent but become in a bright color (brighter than a color when supplied with current) when supplied with no current may be used.

(7) Each of the above embodiments includes the electrochromic layers that become black when supplied with current; however, electrochromic layers that become in a dark color other than black (darker than a color when supplied with no current) when supplied with current may be used. Electrochromic layers that are not colored but become opaque when supplied with current may be used.

(8) In each of the above embodiments, the electrochromic layers have the light absorption spectrum characteristics such that the optical absorptance is increased when current is supplied thereto compared to a case when no current is supplied; however, the electrochromic layers may have light absorption spectrum characteristics such that the optical absorptance is increased when no current is supplied thereto compared to a case when current is supplied.

(9) Other than each of the above embodiments, specific electrochromic material used for the electrochromic layers may be altered as appropriate. Specific material used for the light transmission layers and each electrode may be also altered as appropriate.

(10) Other than each of the above embodiments, specific values of various dimensions of the light transmission layers, the electrochromic layers and each of the electrodes may be altered as appropriate.

(11) In each of the above embodiments, the view angle control sheet is used in combination with the display device; however, the view angle control sheet may be used in other devices as appropriate.

The invention claimed is:

1. A view angle control device comprising:
an electrochromic layer having light absorption spectrum characteristics according to voltages applied thereto, the electrochromic layer including a first extending section extending in a first direction and a second extending section extending in a second direction that crosses the first direction;
light transmission layers that are defined by the first extending section and the second extending section and through which light passes;
a first electrode disposed on one side with respect to the electrochromic layer and the light transmission layers and arranged to overlap the first extending section and contacted with the first extending section;
a second electrode disposed on an opposite side from the first electrode with respect to the electrochromic layer and the light transmission layers and arranged to overlap the second extending section and contacted with the second extending section;
a third electrode disposed on a same side as the first electrode with respect to the electrochromic layer and the light transmission layers and arranged not to overlap the first electrode but to overlap the second extending section and contacted with the second extending section; and
a fourth electrode disposed on a same side as the second electrode with respect to the electrochromic layer and the light transmission layers and arranged not to overlap the second electrode but to overlap the first extending section and contacted with the first extending section.

2. The view angle control device according to claim 1, wherein
the electrochromic layer is configured such that the first extending section includes first extending sections and the first extending sections and the light transmission layers are alternately arranged in the second direction, and the second extending section includes second extending sections and the second extending sections and the light transmission layers are alternately arranged in the first direction, and
the first electrode and the third electrode include first electrodes and third electrodes, respectively, and the first electrodes and the third electrodes extend in the first direction and are alternately arranged in the second direction, and the second electrode and the fourth electrode include second electrodes and fourth electrodes, respectively, and the second electrodes and the fourth electrodes extend in the second direction and are alternately arranged in the first direction.

3. The view angle control device according to claim 2, further comprising:
a first electrode connecting section connected to each of the first electrodes and short-circuiting the first electrodes; and
a second electrode connecting section connected to each of the second electrodes and short-circuiting the second electrodes.

4. The view angle control device according to claim 2, further comprising:
a first electrode driving section connected to each of the first electrodes and configured to supply current to each of the first electrodes independently; and
a second electrode driving section connected to each of the second electrodes and configured to supply current to each of the second electrodes independently.

5. The view angle control device according to claim 4, wherein
the first electrode driving section is configured to drive the first electrodes such that the first electrodes supplied with current and the first electrodes supplied with no current are alternately arranged; and
the second electrode driving section is configured to drive the second electrodes such that the second electrodes supplied with current and the second electrodes supplied with no current are alternately arranged.

6. The view angle control device according to claim 2, further comprising:
a third electrode connecting section connected to each of the third electrodes and short-circuiting the third electrodes; and
a fourth electrode connecting section connected to each of the fourth electrodes and short-circuiting the fourth electrodes.

7. The view angle control device according to claim 1, wherein the electrochromic layer has light absorption spectrum characteristics such that optical absorptance thereof is increased when current is supplied thereto compared to a case when no current is supplied.

8. The view angle control device according to claim 1, further comprising:
a first substrate having a plate surface on which the first electrode and the third electrode are disposed, the first substrate and each of the electrochromic layer and the light transmission layers sandwiching the first electrode and the third electrode therebetween; and
a second substrate having a plate surface on which the second electrode and the fourth electrode are disposed, the second substrate and each of the electrochromic layer and the light transmission layers sandwiching the second electrode and the fourth electrode therebetween.

* * * * *